US008824061B2

(12) United States Patent
Tomioka

(10) Patent No.: US 8,824,061 B2
(45) Date of Patent: Sep. 2, 2014

(54) ZOOM LENS AND IMAGING APPARATUS

(71) Applicant: FUJIFILM Corporation, Tokyo (JP)

(72) Inventor: Ryoko Tomioka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/903,279

(22) Filed: May 28, 2013

(65) Prior Publication Data

US 2013/0258162 A1 Oct. 3, 2013

Related U.S. Application Data

(63) Continuation of application No. PCT/JP2011/006824, filed on Dec. 6, 2011.

(30) Foreign Application Priority Data

Dec. 7, 2010 (JP) .................................. 2010-272144

(51) Int. Cl.
*G02B 15/14* (2006.01)
(52) U.S. Cl.
USPC ........... 359/687; 359/683; 359/684; 359/685; 359/686; 359/714; 359/726; 359/740; 359/764
(58) Field of Classification Search
USPC .................. 359/683–687, 714, 726, 740, 764
See application file for complete search history.

(56) References Cited

U.S. PATENT DOCUMENTS

| 6,266,189 | B1 | 7/2001 | Konno et al. |
|---|---|---|---|
| 6,285,502 | B1 | 9/2001 | Konno et al. |
| 2008/0239506 | A1 | 10/2008 | Ori |
| 2011/0134266 | A1 | 6/2011 | Mihara |

FOREIGN PATENT DOCUMENTS

| JP | H09-230237 | 9/1997 |
|---|---|---|
| JP | 2005-181635 | 7/2005 |
| JP | 2008-096663 | 4/2008 |
| JP | 2008-268833 | 11/2008 |
| JP | 2009-198722 | 9/2009 |
| JP | 2010-039188 | 2/2010 |
| JP | 2010-217228 | 9/2010 |

*Primary Examiner* — Evelyn A. Lester
(74) *Attorney, Agent, or Firm* — Young & Thompson

(57) ABSTRACT

A zoom lens includes a positive first lens group, which is fixed during changing magnification and during focusing, a negative second lens group, which is moved during changing magnification, a positive third lens group, which is fixed during changing magnification and during focusing, a positive fourth lens group, which is moved during changing magnification and during focusing, and a negative fifth lens group, which is moved during changing magnification, which are in this order from an object side. A lens group constituting the first lens group consists of a negative front group and a positive rear group in this order from the object side. The second lens group consists of four lenses of a negative lens, a positive lens, a negative lens, and a positive lens or a negative lens arranged in this order from the object side.

14 Claims, 14 Drawing Sheets

FIG.1
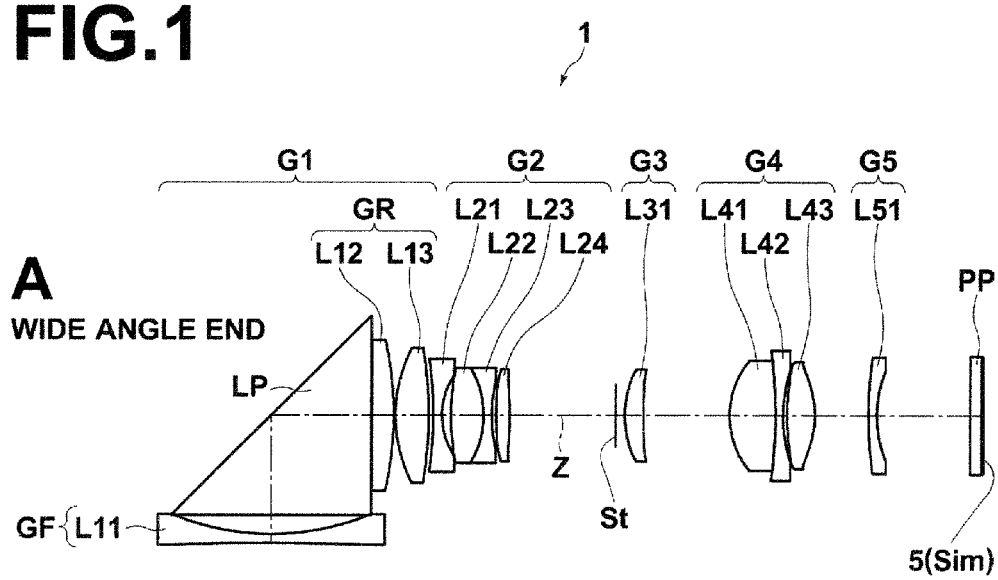
A
WIDE ANGLE END
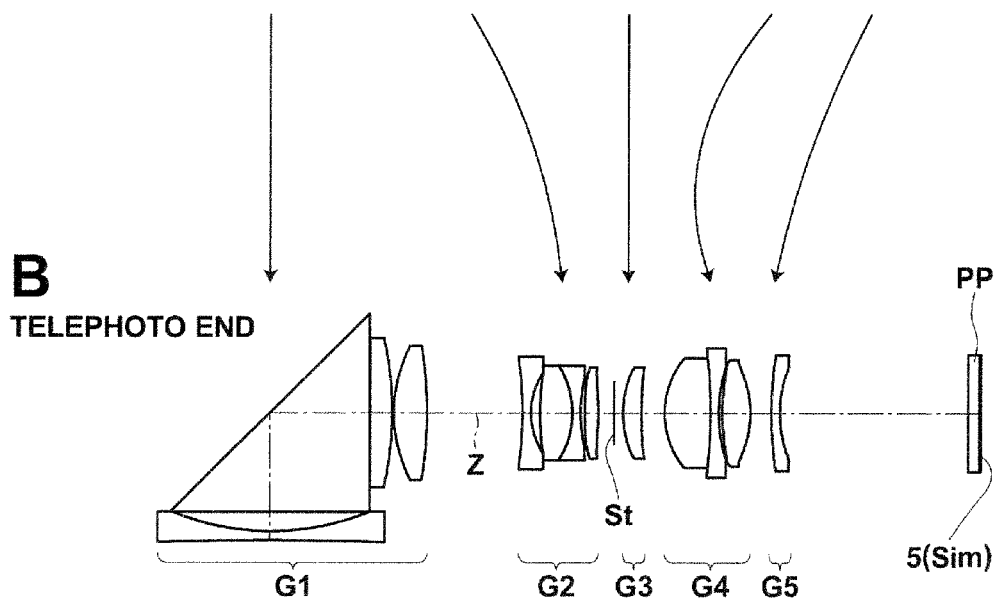
B
TELEPHOTO END

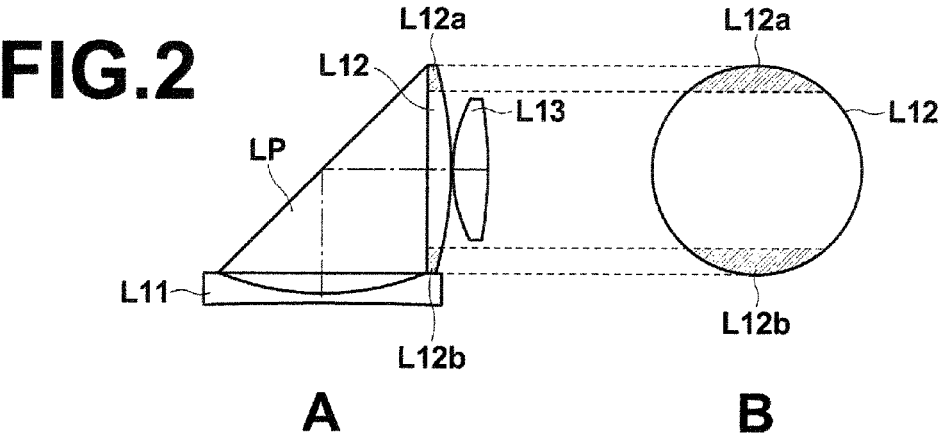
FIG.2
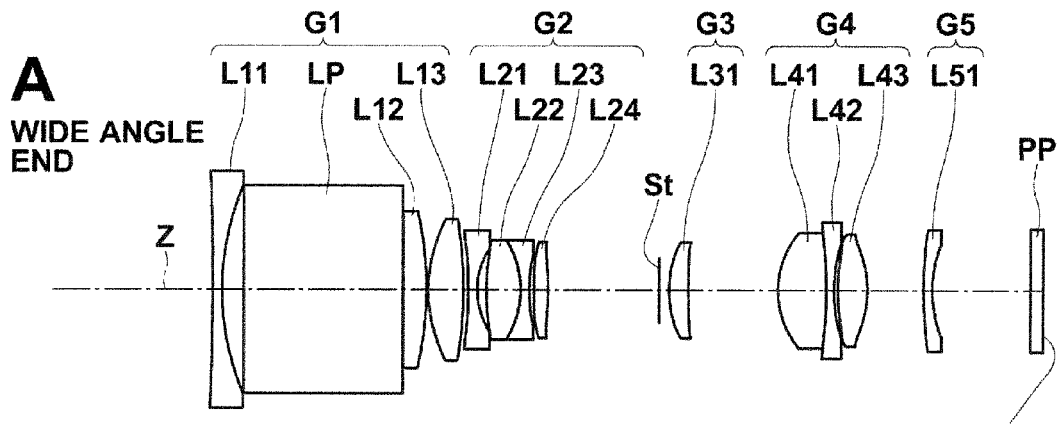
FIG.3 EXAMPLE 1
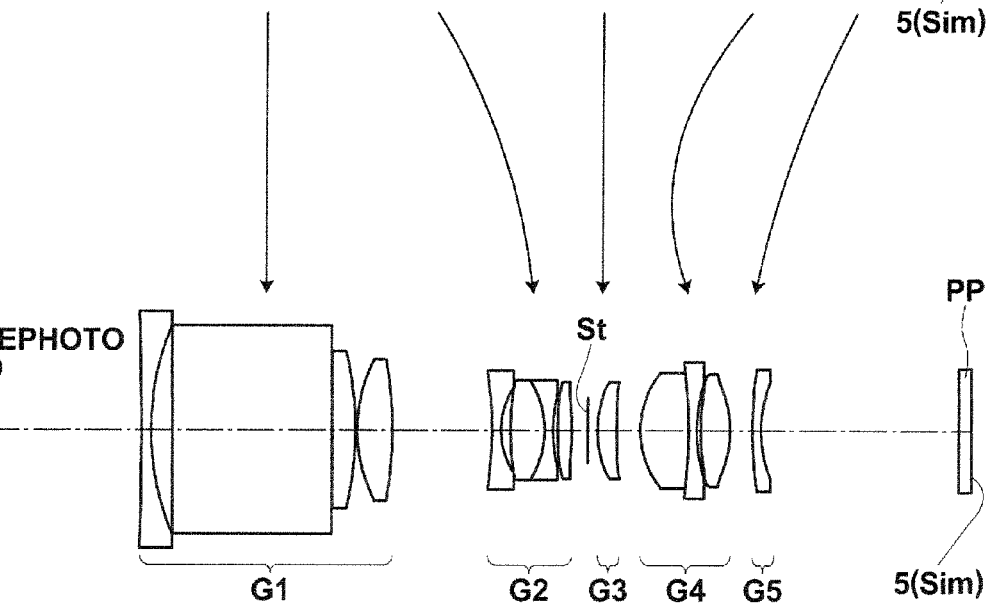

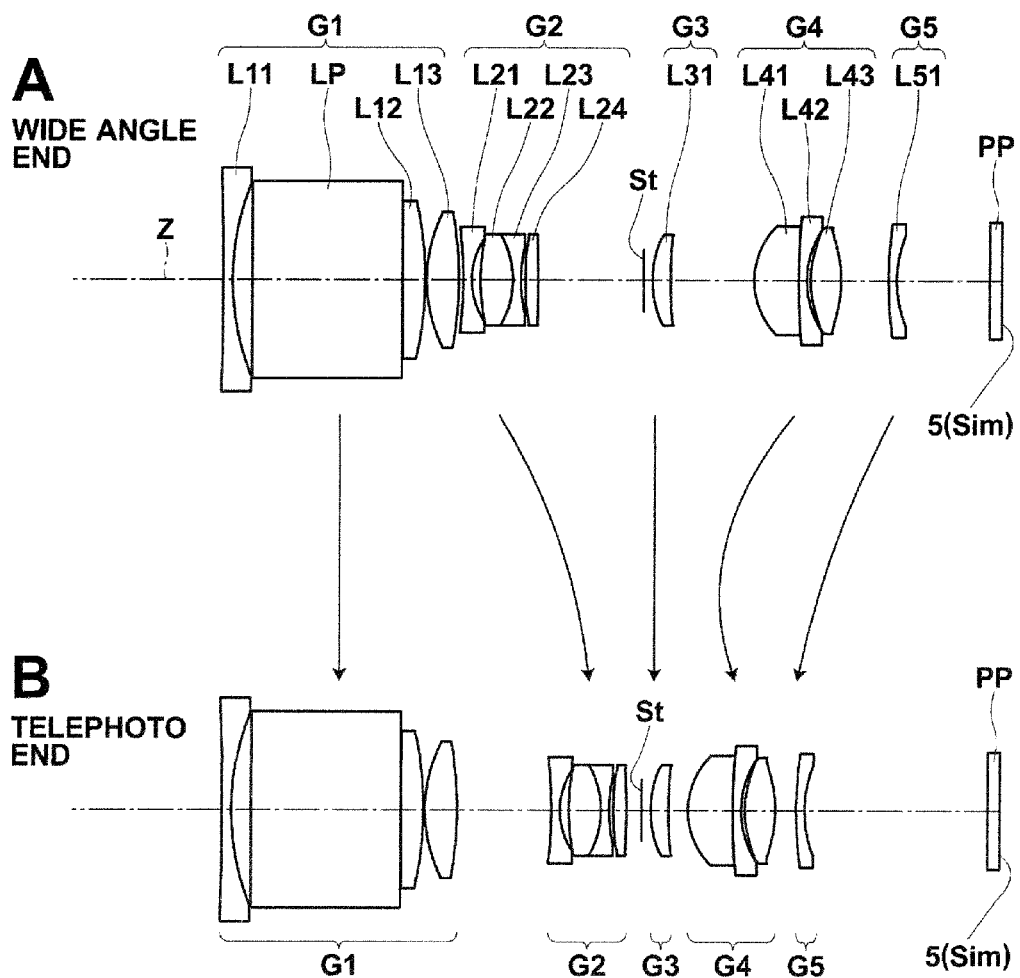

FIG.6 EXAMPLE 4

FIG.8  EXAMPLE 6

ZOOM LENS AND IMAGING APPARATUS

CROSS REFERENCE TO RELATED APPLICATIONS

This application is a continuation of PCT/JP2011/006824 filed on Dec. 6, 2011, which claims foreign priority to Japanese Application No. 2010-272144 filed on Dec. 7, 2010. The entire contents of each of the above applications are hereby incorporated by reference.

BACKGROUND OF THE INVENTION

1. Field of the Invention

The present invention relates to a zoom lens and an imaging apparatus. In particular, the present invention relates to a zoom lens appropriate for a digital camera, a video camera or the like using an imaging device, such as a CCD (Charge Coupled Device) and a CMOS (Complementary Metal Oxide Semiconductor), and an imaging apparatus including the zoom lens.

2. Description of the Related Art

In recent years, as personal computers spread to ordinary families, digital cameras that can input image information, such as a landscape and a portrait, obtained by photography to personal computers became widely used. As a lens system, a zoom lens is mainly used in such a digital camera. Recently, a request for reducing the size of a camera is increasing in addition to a request for increasing the magnification ratio of zoom.

Conventionally, lenses disclosed, for example, in Japanese Unexamined Patent Publication No. 9 (1997)-230237 (Patent Document 1), Japanese Unexamined Patent Publication No. 2010-217228 (Patent Document 3), Japanese Unexamined Patent Publication No. 2005-181635 (Patent Document 3), and Japanese Unexamined Patent Publication No. 2009-198722 (Patent Document 4) are known as a zoom lens for a camera consisting of five groups. Among them, Patent Documents 2 through 4 disclose lenses constituting bending optical systems, in which an optical path is bent at some point in the optical path. Patent Document 1 discloses a zoom lens structured in such a manner that all of five lens groups are moved during changing magnification. Patent Document 2 discloses a zoom lens, in which a fifth lens group is a positive lens group, and a second lens group consists of three lenses of a negative lens, a negative lens, and a positive lens in this order from the object side. Patent Documents 3 and 4 disclose zoom lenses in which a second lens group consists of four lenses of a negative lens, a negative lens, a positive lens, and a negative lens arranged in this order from the object side.

SUMMARY OF THE INVENTION

In recent years, with respect to zoom lenses in the aforementioned fields, there is a request for structuring a lens in such a manner to have a wide angle of view while a high magnification ratio of, for example, about 5 times is secured. Further, there is a request for structuring the lens in such a manner that reduction in the size of an imaging apparatus is possible when the lens is mounted on the imaging apparatus, and reduction in cost is also requested. However, in the zoom lens disclosed in Patent Document 1, a first lens group, which is a most object side group including a large outer diameter lens, is a moving group. Therefore, a drive system for moving the lens group becomes large. Hence, Patent Document 1 is disadvantageous to reduction in size and in cost. In the zoom lens disclosed in Patent Document 2, a full angle of view at a wide angle end is about 82 degrees, which is wide. However, a most-object-side lens having a large outer diameter is an aspherical lens having a high refractive index. Therefore, the lens is disadvantageous when a cost is an important factor. The zoom lens disclosed in Patent Document 3 has a variable magnification ratio of about 5 times. However, a full angle of view at a wide angle end is about 65 degrees, which is hard to be regarded as a wide angle. In the zoom lens disclosed in Patent Document 4, a variable magnification ratio is about 6.7 times, and a full angle of view at a wide angle end is about 80 degrees. However, the total length is long, and the number of lenses constituting the zoom lens is large. Therefore, an improvement is needed in reduction in size and in cost.

In view of the foregoing circumstances, it is an object of the present invention to provide a zoom lens the size of which is reduced, and the angle of view of which is widened, and which can be structured at a low cost, while excellent optical performance and a high magnification ratio are secured. Further, it is another object of the present invention to provide an imaging apparatus including the zoom lens.

A first zoom lens of the present invention is a zoom lens consisting of:

a first lens group having positive refractive power, and which is fixed during changing magnification and during focusing;

a second lens group having negative refractive power, and which is moved during changing magnification;

a third lens group having positive refractive power, and which is fixed during changing magnification and during focusing;

a fourth lens group having positive refractive power, and which is moved during changing magnification and during focusing; and a fifth lens group having negative refractive power, and which is moved during changing magnification, which are in this order from an object side, and wherein a lens group constituting the first lens group consists of a front group having negative refractive power and a rear group having positive refractive power in this order from the object side, and wherein the second lens group consists of four lenses of a negative lens, a positive lens, a negative lens, and a positive lens arranged in this order from the object side, or consists of four lenses of a negative lens, a positive lens, a negative lens, and a negative lens arranged in this order from the object side.

The first zoom lens of the present invention is a zoom lens of at least five lens groups. Five lens groups the refractive powers of which are positive, negative, positive, positive, and negative are arranged in this order from the object side, and the second lens group, the fourth lens group and the fifth lens group are moved during changing magnification. In the zoom lens, the first lens group is always fixed during changing magnification and during focusing, and the lens structure is appropriately set, and especially the second lens consists of four lenses, the arrangement of the powers of which is optimized. Therefore, it is possible to easily reduce a size, widen an angle of view, and reduce a cost while an excellent optical performance and a high magnification ratio are secured.

A second zoom lens of the present invention is a zoom lens comprising:

a first lens group having positive refractive power, and which is fixed during changing magnification and during focusing;

a second lens group having negative refractive power, and which is moved during changing magnification;

a third lens group having positive refractive power, and which is fixed during changing magnification and during focusing;

a fourth lens group having positive refractive power, and which is moved during changing magnification and during focusing; and a fifth lens group having negative refractive power, and which is moved during changing magnification, which are in this order from an object side, and wherein a lens group constituting the first lens group consists of a front group having negative refractive power and a rear group having positive refractive power in this order from the object side, and wherein the following formula (2A) is satisfied:

$$0.70 < |fG2/fw| < 0.89 \quad (2A),$$ where fG2: the focal length of the second lens group; and fw: the focal length of an entire system at a wide angle end.

The second zoom lens of the present invention is a zoom lens of at least five lens groups. Five lens groups the refractive powers of which are positive, negative, positive, positive, and negative are arranged in this order from the object side, and the second lens group, the fourth lens group and the fifth lens group are moved during changing magnification. In the zoom lens, the first lens group is always fixed during changing magnification and during focusing, and the lens structure is appropriately set, and especially the refractive power of the second lens is optimized in such a manner to satisfy formula (2A). Therefore, it is possible to easily reduce a size, widen an angle of view, and reduce a cost while an excellent optical performance and a high magnification ratio are secured.

In the first and second zoom lenses of the present invention, it is desirable that a reflection member that bends an optical path between the front group and the rear group in the first lens group is further provided.

In the first zoom lens of the present invention, it is desirable that the following formula (1) is satisfied:

$$0.70 < IH/fw < 0.90 \quad (1),$$ where

IH: maximum image height, and fw: the focal length of an entire system at a wide angle end.

In the first zoom lens of the present invention, it is desirable that the following formula (2) is satisfied:

$$0.70 < |fG2/fw| < 0.95 \quad (2),$$ where fG2: the focal length of the second lens group, and fw: the focal length of an entire system at a wide angle end.

In the first zoom lens of the present invention, it is desirable that a most-image-side lens in the second lens group has at least one aspherical surface, and that the following formula (3) is satisfied:

$$-0.3 < fw/f24 < 0.3 \quad (3),$$ where fw: the focal length of an entire system at a wide angle end, and f24: the focal length of a most-image-side lens in the second lens group.

In the first zoom lens of the present invention, it is desirable that the second lens group includes at least one aspherical lens made of plastic material.

In the first zoom lens of the present invention, it is desirable that the following formula (4) is satisfied:

$$10.0 < TL/(fw \times \tan(\omega w)) < 13.0 \quad (4),$$ where

TL: a length on an optical axis from an object-side surface of a most-object-side lens in an entire system to an image plane;

fw: the focal length of an entire system at a wide angle end; and

ωw: a half angle of view at a wide angle end.

In the first and second zoom lenses of the present invention, it is desirable that the front group in the first lens group consists of a spherical lens having negative refractive power.

In the first and second zoom lenses of the present invention, it is desirable that the rear group in the first lens group consists of two lenses, each having positive refractive power, and that at least an object-side lens of the two lenses has a shape in which a part of an outer diameter shape is cut off.

In the first and second zoom lenses of the present invention, the sign of the refractive power of a lens represents a refractive power in a paraxial region when each lens is an aspherical lens.

The maximum image height may be determined, for example, based on the size of an imaging plane of an imaging device when a zoom lens is mounted on an apparatus together with the imaging device arranged at the image plane of the zoom lens.

For example, when an imaging plane is rectangular, and the optical axis of the zoom lens passes the center of the imaging plane, and when there is no other factor restricting the image height, a half of a diagonal length of the imaging plane may be used as an image height.

An imaging apparatus of the present invention includes the aforementioned zoom lens of the present invention and an imaging device that images an optical image formed by the zoom lens, and that outputs an electrical signal.

According to the zoom lens of the present invention, the lens structure of a zoom lens of at least five group type is appropriately set, and especially, the structure of the second lens group is optimized. Therefore, it is possible to reduce a size, widen an angle of view, and reduce a cost while an excellent optical performance and a high magnification ratio are secured.

According to the imaging apparatus of the present invention, the apparatus includes the zoom lens of the present invention. Therefore, imaging at a wide angle of view is possible, and it is possible to reduce a size and a cost while a high imaging performance including an excellent optical performance and a high magnification ratio is secured.

BRIEF DESCRIPTION OF THE DRAWINGS

FIG. 1 is a cross section illustrating the lens structure of a zoom lens according to an embodiment of the present invention, and Section A is a state at a wide angle end, and Section B is a state at a telephoto end;

FIG. 2 is a diagram for explaining the outer diameter shape of a lens in the first lens group;

FIG. 3 is a cross section illustrating the lens structure of a zoom lens in Example 1 of the present invention, and Section A is a state at a wide angle end, and Section B is a state at a telephoto end;

FIG. 4 is a cross section illustrating the lens structure of a zoom lens in Example 2 of the present invention, and Section A is a state at a wide angle end, and Section B is a state at a telephoto end;

DESCRIPTION OF THE PREFERRED EMBODIMENTS

Figure 5:
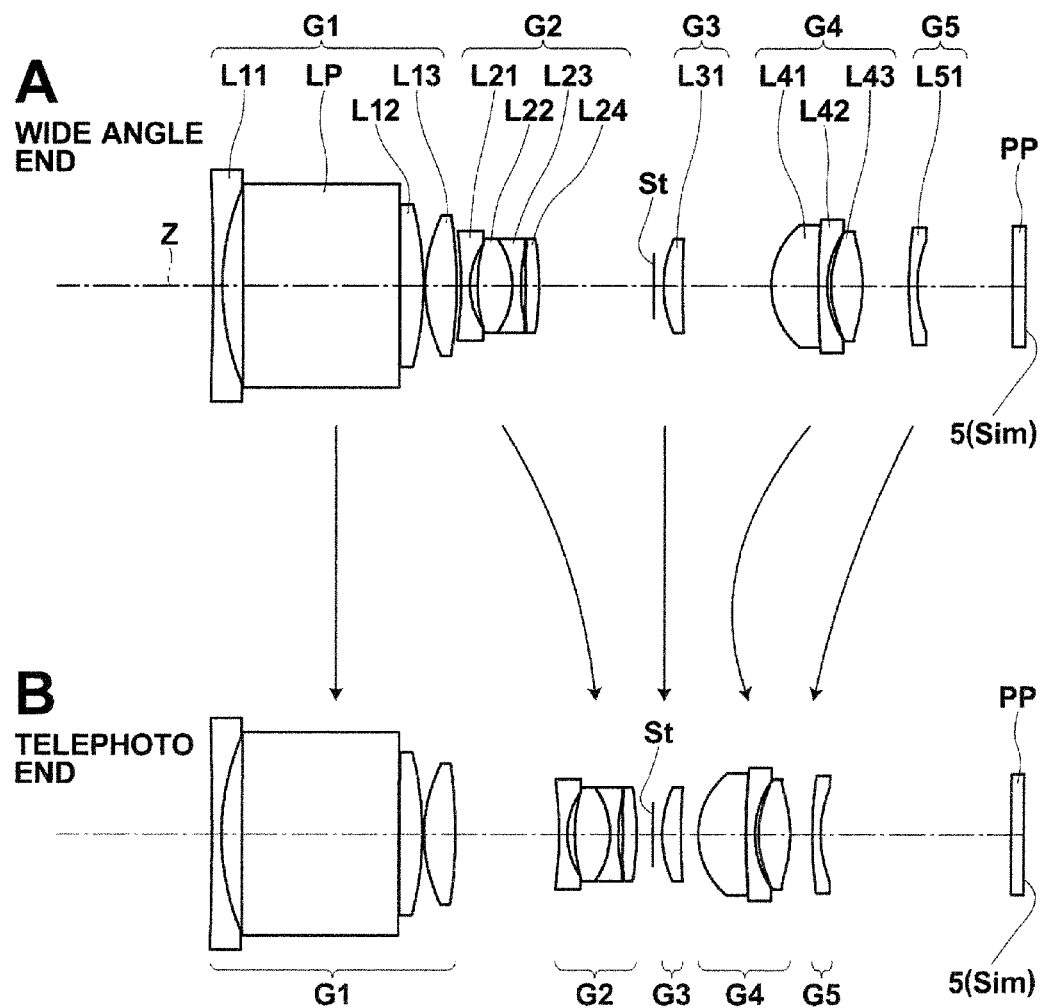
FIG. 5 is a cross section illustrating the lens structure of a zoom lens in Example 3 of the present invention, and Section A is a state at a wide angle end, and Section B is a state at a telephoto end.
Figure 6:
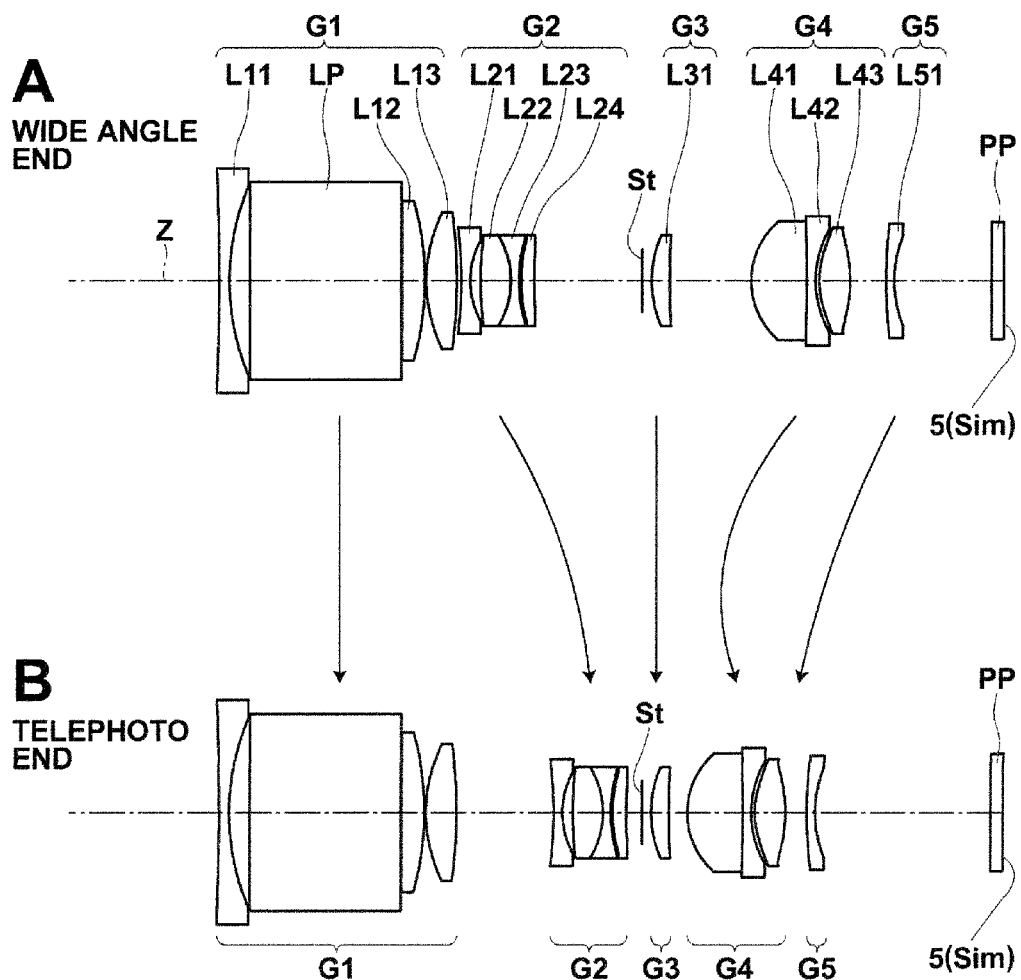
FIG. 6 is a cross section illustrating the lens structure of a zoom lens in Example 4 of the present invention, and Section A is a state at a wide angle end, and Section B is a state at a telephoto end.
Figure 7:
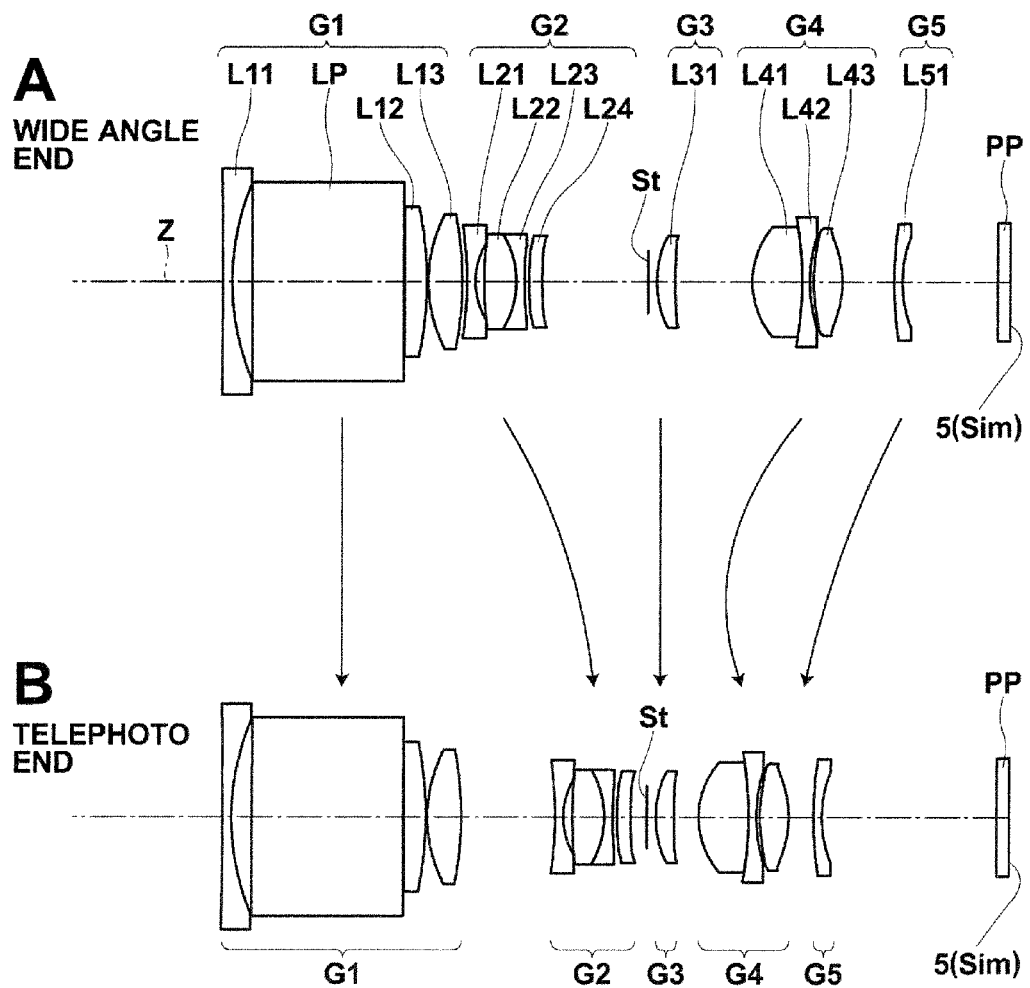
FIG. 7 is a cross section illustrating the lens structure of a zoom lens in Example 5 of the present invention, and Section A is a state at a wide angle end, and Section B is a state at a telephoto end.
Figure 8:
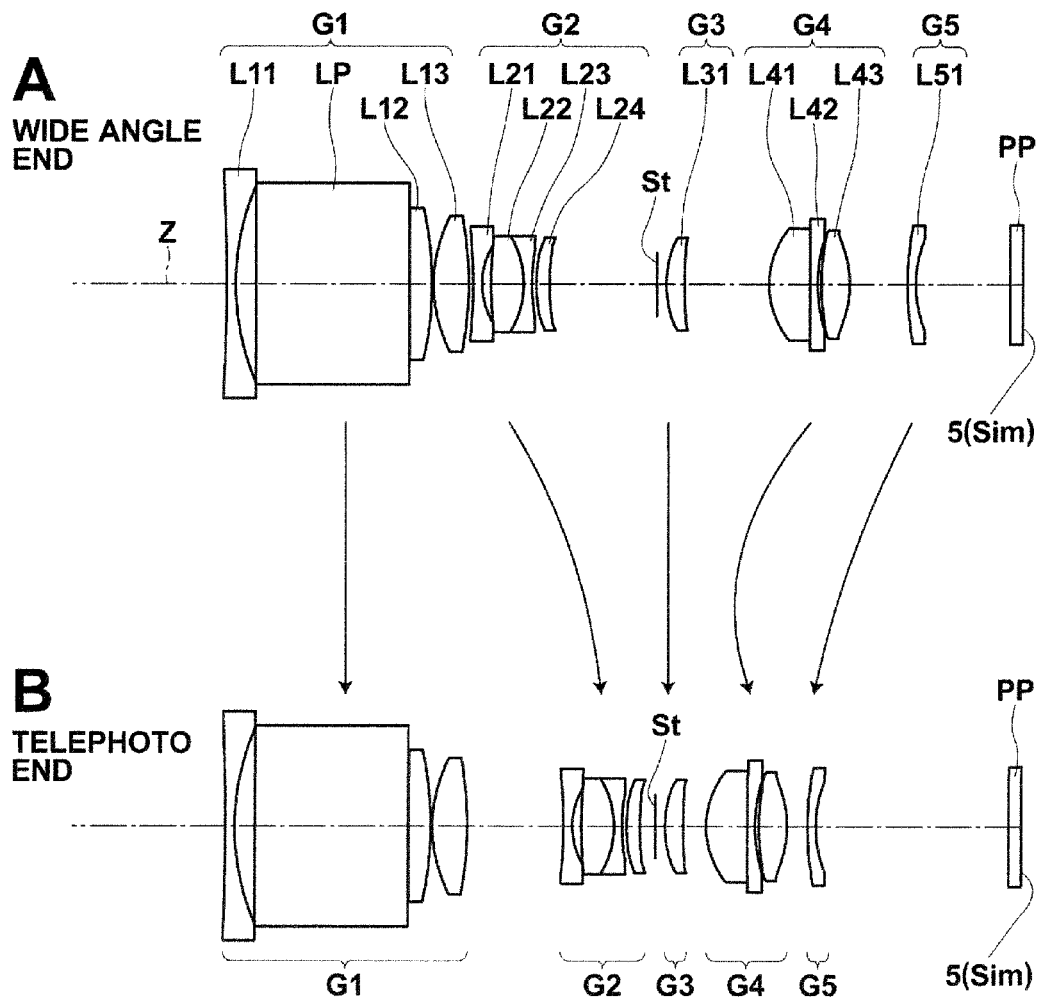
FIG. 8 is a cross section illustrating the lens structure of a zoom lens in Example 6 of the present invention, and Section A is a state at a wide angle end, and Section B is a state at a telephoto end.

Hereinafter, embodiments of the present invention will be described in detail with reference to drawings. First, a zoom lens according to an embodiment of the present invention will be described with reference to FIG. 1, Sections A and B.

FIG. 1, Section A and FIG. 1, Section B are cross sections of a structure example of a zoom lens 1 according to an embodiment of the present invention. The structure example illustrated in FIG. 1, Section A and FIG. 1, Section B correspond to a zoom lens in Example 1, which will be described later. FIG. 1, Section A and FIG. 1, Section B illustrate the arrangement of lenses at a wide angle end and at a telephoto end, respectively, in a state of focusing on an object at infinity. Further, arrows between FIG. 1, Section A and FIG. 1, Section B schematically illustrate the path of movement of each lens group when magnification is changed.

The zoom lens 1 includes five lens groups of first lens group G1 through fifth lens group G5. The zoom lens 1 is mountable on an imaging apparatus, for example, such as a video camera and a digital still camera. FIG. 1, Section A and FIG. 1, Section B illustrate also an imaging device 5, which is arranged at image plane Sim of the zoom lens 1, considering a case in which the zoom lens 1 is applied to an imaging apparatus. In FIG. 1, Section A and FIG. 1, Section B, the imaging device 5 is illustrated in a simplified manner, but in actual cases, the imaging device 5 is arranged in such a manner that the imaging plane of the imaging device 5 matches with the position of image plane Sim. The imaging device 5 images an optical image formed by the zoom lens 1, and outputs an electrical signal. For example, a CCD, a CMOS or the like may be used as the imaging device 5. An imaging apparatus according to an embodiment of the present invention comprises the zoom lens 1 and the imaging device 5.

When the zoom lens 1 is mounted on an imaging apparatus, it is desirable that the imaging apparatus is structured in such a manner to include a cover glass for protecting an imaging plane of an imaging device and various filters, such as a low-pass filter and an infrared ray cut filter, which are appropriately selected based on the specification of the imaging apparatus. FIG. 1, Section A and FIG. 1, Section B illustrate a structure example in which an image-side surface of parallel-flat-plate-shaped optical member PP assuming the cover glass and various filters is arranged in such a manner to match with image plane Sim of the zoom lens. The position of the optical member PP is not limited to the positions illustrated in FIG. 1, Section A and FIG. 1, Section B. An air space may be provided between the optical member PP and the image plane Sim.

The zoom lens 1 includes first lens group G1 having positive refractive power, second lens group G2 having negative refractive power, third lens group G3 having positive refractive power, fourth lens group G4 having positive refractive power, and fifth lens group G5 having negative refractive power, which are along optical axis Z in this order from an object side.

The zoom lens 1 is structured in such a manner to change magnification by changing a distance between groups. Specifically, the first lens group G1 and the third lens group G3 are always fixed during changing magnification and during focusing. The second lens group G2, the fourth lens group G4, and the fifth lens group G5 are moved on the optical axis Z during changing magnification. The fourth lens group G4 has a focusing function, and is moved on the optical axis Z during focusing.

A high magnification ratio is advantageously achievable by giving the aforementioned refractive power to each lens group, and by changing magnification by moving the second lens group G2, the fourth lens group G4, and the fifth lens group G5. Further, the most-object-side first lens group G1 including a lens having a large outer diameter is always fixed during changing magnification and during focusing. Therefore, it is possible to reduce a load on a drive system, and to reduce a size and a cost.

The first lens group G1 may consist of, for example, front group GF having negative refractive power, prism LP, as a reflection member for bending an optical path, and rear group GR having positive refractive power in this order from the object side. It is desirable that the front group GF consists of one spherical lens having negative refractive power, which is lens L11. The lens L11 may be a double concave lens. When the most-object-side lens in an entire system is a negative lens, it is possible to advantageously widen an angle of view. When the lens has double concave shape, it is possible to give strong negative refractive power, and that is more advantageous to widening the angle of view. Since the outer diameter of the lens L11, which is the most-object-side lens, is large, if the lens L11 is a spherical lens, it is possible to greatly reduce a cost, compared with a case of using an aspherical lens.

The prism LP constitutes a bending optical system that bends an optical path between the front group GF and the rear group GR at a right angle. Since such a bending optical system is structured, when the zoom lens 1 is mounted on an imaging apparatus, it is possible to reduce the thickness of the imaging apparatus. As a reflection member for bending an optical path, a different member, such as a reflection mirror, may be used instead of the prism LP.

It is desirable that the rear group GR consists of two lenses L12, L13, each having positive refractive power. It is desirable that an object-side surface of the lens L12, which is arranged on the prism-LP-side in the rear group GR, is a flat plane. In such a case, the productivity is improved, and that has cost advantage, and can also contribute to reduction in size. It is desirable that at least a surface of the lens L13, which is arranged on the image-side of the rear group GR, is aspherical. In such a case, it is possible to easily suppress a fluctuation of aberrations during changing magnification.

When the rear group GR of the first lens group G1 consists of two positive lenses, it is desirable that at least an object-side lens of the two positive lenses has a shape in which a part of an outer diameter shape is cut off. Such a structure can contribute to reduction in the thickness of an imaging apparatus on which the zoom lens 1 is mounted.

FIG. 2, Section A and FIG. 2, Section B illustrate a structure example when the lens L12 has a shape in which a part of an outer diameter shape is cut off. FIG. 2, Section A is a cross section including optical axis Z, and FIG. 2, Section B is a plan view in a plane perpendicular to the optical axis. The lens L12 may have a shape in which cut off portions L12a, L12b, as indicated by shadows in FIG. 2, Section A and FIG. 2, Section B, are cut off from a round shape.

Especially, it is desirable that the cut off portion L12b, which is adjacent to the lens L11 in the front group GF, is cut off, as illustrated in FIG. 2, Section A. When the lens L12 has such a shape, even if the front group GF and the rear group GR are placed close to each other, lenses do not interfere with each other. Therefore, it is possible to reduce the thickness of an imaging apparatus on which the zoom lens 1 is mounted. Further, when the cut off portion L12a facing the cut off portion L12b is also provided, it is possible to contribute to reduction in the thickness of the imaging apparatus on which the zoom lens 1 is mounted.

When the zoom lens 1 is mounted on the imaging apparatus together with the imaging device 5 which is arranged at image plane Sim of the zoom lens 1, it is desirable that the shape, the size and the position of the cut off portion or portions are set based on the shape of the imaging device. Ordinarily, the imaging device 5 is rectangular. Therefore, even if a part of the outer diameter shape of the lens is cut off, if the structure of the cut off portion or portions is set based on the shape of the imaging device, it is considered that no problem is caused in imaging performance.

The second lens group G2 may be structured by arranging four lenses of negative lens L21, positive lens L22, negative lens L23, and positive or negative lens L24 in this order from the object side. When the second lens group G2, which is a moving group, consists of four lenses, it is possible to give high aberration correction capability. For example, when an angle of view is widened, it is considered that aberration should be corrected by providing an aspherical surface in the most-object-side lens in the first lens group G1. In such a case, since the most-object-side lens in the first lens group G1 has a large outer diameter, the cost becomes high. However, when the second lens group G2 consists of four lenses, as in the zoom lens 1 of the present embodiment as described above, even if an angle of view is widened, it is possible to correct aberration in an excellent manner without providing an aspherical surface in the most-object-side lens in the first lens group G1.

Further, since lenses at the first and second positions from the object side in the second lens group G2 are a negative lens and a positive lens, respectively, and especially the positive lens is arranged at the second position from the object side, the positive lens at the second position can immediately correct a chromatic aberration generated by bending rays at the negative lens at the first position. Consequently, it becomes easy to suppress fluctuation of a lateral chromatic aberration during changing magnification, and that is advantageous to widening an angle of view. If both of the lenses at the first and second positions from the object side in the second lens group G2 are negative lenses, a chromatic aberration generated by the negative lens at the first position by bending rays becomes even larger by a chromatic aberration generated by the negative lens at the second position. Therefore, even if a positive lens is arranged on the image-side of the negative lens at the second position, a heavy load of aberration correction is imposed on the positive lens. In these circumstances, the aforementioned power arrangement of the second lens group G2 of the zoom lens 1 of the present invention is appropriate.

Specifically, for example, the lens L21 may be a double concave lens, and the lens L22 may be a double convex lens, and the lens L23 may be a double concave lens. When the two negative lenses in the second lens group G2 are double concave lenses, it is possible to give a certain level of negative refractive power to the second lens group G2. Further, it is possible to suppress the total length of the optical system. Further, it is desirable that the lens L22 is a double convex lens to keep a power balance with the two double concave lenses. It is desirable that the lens L22 and the lens L23 are cemented together to correct a chromatic aberration without lowering an allowable value of production error.

Further, it is desirable that the second lens group G2 includes at least one lens at least one of the surfaces of which is aspherical. When the second lens group G2, which is a moving group, includes an aspherical lens, it becomes easy to suppress fluctuation of aberrations caused by changing magnification. Further, when the second lens group G2 includes an aspherical lens, it is desirable that at least one of the aspherical lens or lenses is made of plastic material. Consequently, it is possible to reduce a cost.

A change in performance by a change in temperature of the plastic lens is larger than a glass lens. Therefore, it is desirable that a lens having a relatively weak refractive power is a plastic lens. Meanwhile, formation of a burr on a circumference of a plastic lens is inevitable because of the production method of the plastic lens. When the arrangement of the plastic lens is considered, it is desirable that the plastic lens is arranged on the most-object-side or the most-image-side in the lens group to suppress eccentricity caused by a burr during assembly. Further, when strong negative refractive power is given to the most-object-side lens in the second lens group G2, which rays converged by the positive first lens group G1 enter, it is possible to make a principal point of the second lens group G2 closer to the first lens group G1 side, and that is advantageous to reduction in size. Under these circumstances, it is desirable that the most-image-side lens in the second lens group G2 is an aspherical lens made of plastic material.

The third lens group G3 may consist of, for example, one lens L31. For example, both surfaces may be aspherical, and the lens may have a positive meniscus shape in a paraxial region.

Aperture stop St may be arranged, for example, in the vicinity of the object side of the lens group G3, and structured in such a manner to be fixed during changing magnification. When the aperture stop St is arranged substantially in the middle of the entire system, it is possible to suppress the height of rays in the first lens group G1 and the fifth lens group G5, and to contribute to reduction in size. The aperture stop St illustrated in FIG. 1, Section A and FIG. 1, Section B does not represent the size nor the shape of the aperture stop, but a position on an optical axis.

The fourth lens group G4 is a lens group that moves during changing magnification and that also moves during focusing. It is desirable that a high magnification ratio zoom lens includes a non-linear movement group that moves in such a manner that its own movement amount and movement amounts of the other lens groups during changing magnification has a non-linear relationship, to keep the image plane constant. In the zoom lens 1, the fourth lens group G4 functions as the non-linear movement group. Specifically, when magnification is changed from a wide angle end to a telephoto end, the fourth lens group G4 moves to the object side, and after then, reverses toward the image side at some point in motion. The fourth lens group G4 moves in such a manner to draw an arc-shaped movement path that is convex toward the object side. When the non-linear movement group that moves during changing magnification moves also during focusing, it is possible to simplify the mechanical structure of the apparatus, and to contribute to reduction in size and cost.

The fourth lens group G4 may consist of, for example, a cemented lens of positive lens L41 and negative lens L42, and positive lens L43 in this order from the object side. When cemented lenses are provided in both of the second lens group G2 and the fourth lens group G4, which are located on either side of the aperture stop St, and both of which are moving groups, it becomes easy to suppress fluctuation in a lateral chromatic aberration during changing magnification.

The fifth lens group G5 may consist of, for example, one lens L51. The lens L51 may be a negative meniscus lens having a convex surface toward the object side. When the fifth lens group G5, which is the most-image-side group, consists of one negative meniscus lens having a convex surface toward the object side, it is possible to correct curvature of field in an excellent manner, and to reduce the size and the cost.

It is desirable that the zoom lens 1 is structured in such a manner to satisfy the following formulas appropriately and optionally. As a desirable mode, one of the following formulas may be satisfied, or an arbitrary combination of plural formulas may be satisfied.

It is desirable that the zoom lens 1 satisfies the following formula (1):

$$0.70 < IH/fw < 0.90 \quad (1), \text{where}$$

IH: maximum image height, and fw: the focal length of an entire system at a wide angle end.

The formula (1) is related to an angle of view at a wide angle end. When the value is lower than the lower limit of the formula (1), it is impossible to obtain a sufficiently wide angle of view.

When the value exceeds the upper limit of the formula (1), the angle of view becomes too wide, and the size of the first lens group G1 becomes large, and the total length becomes long.

It is desirable that the following formula (1A) is satisfied instead of the formula (1) to further reduce the size while the angle of view is widened.

$$0.70 < IH/fw < 0.85 \quad (1A)$$

Further, it is desirable that the zoom lens 1 satisfies the following formula (2):

$$0.70 < |fG2/fw| < 0.95 \quad (2), \text{where}$$

fG2: the focal length of the second lens group G2, and fw: the focal length of an entire system at a wide angle end.

The formula (2) is related to a ratio of the focal length of the second lens group G2 and the focal length of the entire system at a wide angle end. When the value is lower than the lower limit of the formula (2), the refractive power of the second lens group G2 becomes too strong. Therefore, it becomes difficult to correct aberrations. When the value exceeds the upper limit of the formula (2), the refractive power of the second lens group G2 becomes too weak. Therefore, a movement amount during changing magnification becomes large, and the total length becomes long.

Here, when the following formula (2A) is satisfied instead of the formula (2), it is possible to further reduce the size while an excellent optical performance is secured. The following formula (2A) defines an appropriate range of the focal length of the second lens group G2 to sufficiently satisfy a current request for achieving both an excellent optical performance and reduction in size.

$$0.70 < |fG2/fw| < 0.89 \quad (2A)$$

It is desirable that the following formula (2B) is satisfied instead of the formula (2A) to obtain a more excellent optical performance.

$$0.80 < |fG2/fw| < 0.89 \quad (2B)$$

Further, it is desirable that the zoom lens 1 satisfies the following formula (3) when the most-image-side lens L24 in the second lens group G2 has at least one aspherical surface.

$$-0.3 < fw/f24 < 0.3 \quad (3), \text{where}$$

fw: the focal length of an entire system at a wide angle end, and f24: the focal length of a most-image-side lens in the second lens group G2.

The formula (3) is related to a ratio of the focal length of the lens L24 and the focal length of the entire system at a wide angle end when the lens L24 is an aspherical lens. Use of plastic material for an aspherical lens has cost advantage. When the lens L24 is made of plastic material, if the value is lower than the lower limit of the formula (3) or exceeds the upper limit of the formula (3), the refractive power of the lens L24 becomes strong, and an influence of a change in temperature on the performance becomes large.

When the lens L24 is made of plastic material, it is more desirable that the following formula (3A) is satisfied instead of the formula (3) to further suppress an influence of a change in temperature on the performance. Further, it is even more desirable that the following formula (3B) is satisfied instead of the formula (3) to even further suppress the influence.

$$-0.25 < fw/f24 < 0.25 \quad (3A)$$

$$-0.1 < fw/f24 < 0.25 \quad (3B)$$

It is desirable that the zoom lens 1 satisfies the following formula (4):

$$10.0 < TL/(fw \times \tan(\omega w)) < 13.0 \quad (4), \text{where}$$

TL: a length on an optical axis from an object-side surface of a most-object-side lens in an entire system to an image plane;

fw: the focal length of an entire system at a wide angle end; and

ωw: a half angle of view at a wide angle end.

The formula (4) is related to a whole length, a focal length at a wide angle end, and a half angle of view. When the value is lower than the lower limit of the formula (4), an exit pupil position becomes close to image plane Sim, and an incident angle of rays of a large angle of view entering the imaging device 5 becomes large, and a problem of an insufficient light amount in the periphery, a color shading or the like arises. When the value exceeds the upper limit of the formula (4), the whole length becomes long. Therefore, when a bending optical system, as illustrated in FIG. 1, Section A and FIG. 1, Section B, is mounted on a camera, the size of the camera in the direction of the height of the camera becomes large.

It is desirable that the following formula (4A) is satisfied instead of the formula (4) to improve the effect obtained by satisfying the formula (4).

$$11.0 < TL/(fw \times \tan(\omega w)) < 12.5 \quad (4A)$$

Here, when the zoom lens 1 is used in tough conditions, for example, such as outdoors, it is desirable that the lens arranged on the most object side uses a material resistant to a deterioration of a surface by wind and rain and a change in temperature by direct sun light, and resistant to chemicals, such as oils and fats and detergents. In other words, it is desirable to use a material that is highly water-resistant, weather-resistant, acid-resistant, chemical-resistant, and the like. Further, it is desirable to use a material that is hard and not easily breakable. When it is important to satisfy these requirements, it is desirable that the material of the lens arranged on the most object side is glass. Alternatively, transparent ceramic may be used.

When the zoom lens 1 is used in tough conditions, it is desirable that a multi-layer coating for protection is applied. Besides the coating for protection, an anti-reflection coating for reducing ghost light or the like during usage may be applied.

In the example illustrated in FIG. 1, Section A and FIG. 1, Section B, optical member PP is arranged further on the image side of the most-image-side lens. Alternatively, various filters may be arranged between the lenses. Alternatively, a coating having a similar function to various filters may be applied to a lens surface of one of the lenses.

Figure 15:
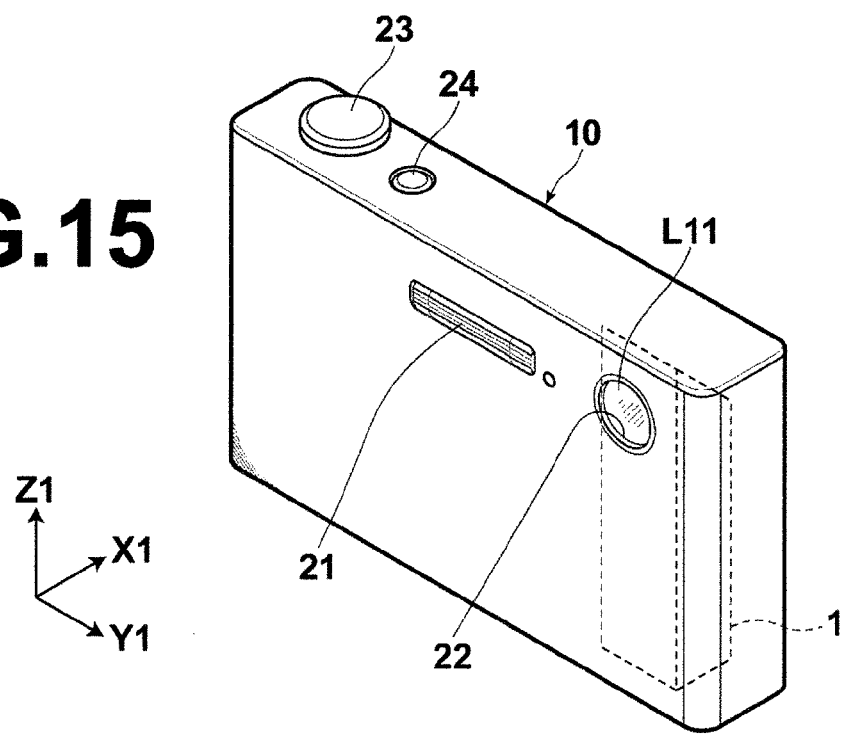
FIG. 15 is a perspective view of the front side of an imaging lens according to an embodiment of the present invention.
Figure 16:
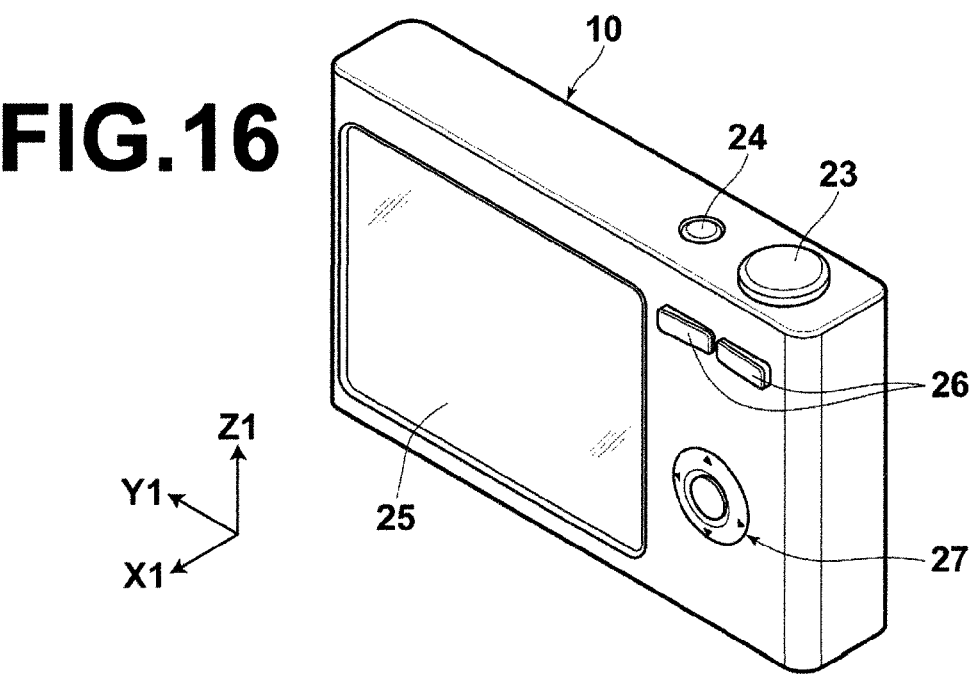
FIG. 16 is a perspective view of the back side of the imaging lens according to an embodiment of the present invention.

Next, an embodiment of an imaging apparatus of the present invention will be described. FIG. 15 and FIG. 16 are perspective views of a front side and a back side of a digital camera 10 according to an embodiment of an imaging apparatus of the present invention, respectively. The digital camera 10 includes a strobe light output unit 21, which outputs strobe light, at an upper center part of the front side. Further, a photography opening 22, through which light from a photography target enters, is provided on a side of the strobe light output unit 21. Further, the digital camera 10 includes a shutter button 23 and a power source button 24 on the upper surface, and a display unit 25 and operation units 26, 27 on the back side.

The digital camera 10 includes, as an imaging lens, the zoom lens 1 according to an embodiment of the present invention in a housing. However, in FIG. 15, the zoom lens 1 is schematically illustrated.

Further, an imaging device, such as a CCD and a CMOS, (not illustrated) is arranged in the housing of the digital camera 10 in such a manner that the imaging plane of the imaging device matches with the position of the image plane of the zoom lens 1.

The zoom lens 1 is arranged in such a manner that the most-object-side lens L11 is located at the photography opening 22 provided on the front side. Further, a part from prism LP, which bends the optical path, to the image plane is mounted in such a manner that the optical axis Z of the part and the vertical direction (Z1 direction) of the camera body match with each other. When the digital camera 10 is structured in such a manner, it is possible to reduce the thickness of the camera body (X1 direction), and to reduce the thickness of the camera. Alternatively, a part from prism LP, which bends the optical path, to the image plane may be mounted in such a manner that the optical axis Z of the part and the horizontal direction of the camera body (Y1 direction) match with each other.

Next, numerical value examples of the zoom lens of the present invention will be described. FIG. 3 through FIG. 8 illustrate lens cross sections of zoom lenses of Example 1 through Example 6, respectively. The structure examples illustrated in FIG. 3 through FIG. 8 also assume a bending optical system in which an optical path is bent by prism LP. In FIG. 3 through FIG. 8, a bent optical path is developed. The other method of illustration of FIG. 3 through FIG. 8 is basically similar to the method of illustration of FIG. 1.

Table 1 shows basic lens data on a zoom lens of Example 1, and Table 2 shows data on distances between groups, and Table 3 shows aspheric coefficients. Similarly, Table 4 through Table 18 show basic lens data, data on distances between groups and aspheric coefficients on zoom lenses of Examples 2 through 6. Next, the meanings of signs in the tables will be described, using the tables of Example 1 as an example. The meaning of signs in the tables of Examples 2 through 6 are basically similar.

In the basic lens data of Table 1, the column Si shows the surface numbers of i-th (i=1, 2, 3, . . . ) surfaces. The surface number of the object-side surface of the most-object-side element is one, and the surface numbers sequentially increase toward the image side. The column Ri shows the curvature radius of the i-th surface. The column Di shows a distance, on optical axis Z, between the i-th surface and the (i+1)th surface. The column Ndj shows the refractive index of a j-th (j=1, 2, 3, . . . ) lens with respect to d-line (wavelength is 587.6 nm) when the most-object-side lens is the first lens, and the value of j sequentially increases toward the image side. Further the column of vdj shows the Abbe number of the j-th lens with respect to d-line.

The sign of a curvature radius is positive when the shape of a surface is convex toward the object side, and negative when the shape of a surface is convex toward the image side. Further, the basic lens data include aperture stop St and optical member PP. The sign (St) is written for a surface of the aperture stop together with a surface number. Further, values on the top of Table 1 indicate ranges of focal length f (mm), Fno. and full angle of view 2ω (degree) when magnification is changed from a wide angle end to a telephoto end.

In the basic lens data of Table 1, change d8, change d15, change d18, change d23, and change d25 are written in the rows of surface distances that change when magnification is changed. The change d8 is a distance between the first lens group G1 and the second lens group G2, and the change d15 is a distance between the second lens group G2 and aperture stop St, and the change d18 is a distance between the third lens group G3 and the fourth lens group G4. The change d23 is a distance between the fourth lens group G4 and the fifth lens group G5, and the change d25 is a distance between the fifth lens group G5 and optical member PP. Data on distances between groups in Table 2 show the focal length of the entire system, change d8, change d15, change d18, change d23 and change d25 at a wide angle end, at middle, and at a telephoto end.

In the lens data of Table 1, mark * is attached to the surface number of an aspherical surface. Table 1 shows, as the curvature radius of the aspherical surface, the numerical value of a paraxial curvature radius. Table 3 shows aspheric coefficients about the aspherical surfaces. In the numerical values of the aspheric coefficients in Table 3, "E−n" (n: integer) means "×10$^{-n}$", and "E+n" means "×10$^{n}$". The aspheric coefficients are coefficients KA, Am (m=3, 4, 5, . . . ) in the following aspherical equation:

$$Zd = C \cdot h^2 / \{1 + (1 - KA \cdot C^2 \cdot h^2)^{1/2}\} + \Sigma Am \cdot h^m, \text{ where}$$

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: paraxial curvature, and KA, Am: aspheric coefficients (m=3, 4, 5, . . . ).

Here, mm is used as the unit of length. However, since an optical system can be used by proportionally enlarging or reducing the optical system, other appropriate units may be used. Further, in each of the tables, values are rounded to predetermined digits.

TABLE 1

EXAMPLE 1 BASIC LENS DATA
f = 5.12~24.11, Fno. = 4.0~5.2, 2ω = 80.0~17.4

| Si | Ri | Di | Ndj | vdj |
|---|---|---|---|---|
| 1 | −199.8332 | 0.60 | 1.92286 | 20.9 |
| 2 | 16.7753 | 1.33 | | |
| 3 | ∞ | 9.95 | 1.78472 | 25.7 |
| 4 | ∞ | 0.04 | | |
| 5 | ∞ | 1.45 | 1.60300 | 65.4 |
| 6 | −21.5734 | 0.10 | | |
| 7* | 9.2742 | 2.19 | 1.56865 | 58.6 |
| 8* | −24.3248 | CHANGE d8 | | |
| 9 | −25.0139 | 0.55 | 1.88300 | 40.8 |
| 10 | 4.8184 | 0.59 | | |
| 11 | 17.5853 | 2.14 | 1.84666 | 23.8 |
| 12 | −5.8880 | 0.53 | 1.88300 | 40.8 |
| 13 | 9.9853 | 0.30 | | |
| 14* | 56.3206 | 0.87 | 1.63355 | 23.6 |

TABLE 1-continued

EXAMPLE 1 BASIC LENS DATA
f = 5.12~24.11, Fno. = 4.0~5.2, 2ω = 80.0~17.4

| Si | Ri | Di | Ndj | vdj |
|---|---|---|---|---|
| 15* | −21.7945 | CHANGE d15 | | |
| 16(St) | ∞ | 0.60 | | |
| 17* | 6.9597 | 1.20 | 1.50957 | 56.5 |
| 18* | 51.2737 | CHANGE d18 | | |
| 19 | 5.6769 | 3.03 | 1.48749 | 70.2 |
| 20 | −32.0520 | 0.50 | 2.00069 | 25.5 |
| 21 | 9.9947 | 0.25 | | |
| 22* | 11.7003 | 1.83 | 1.50957 | 56.5 |
| 23* | −6.4423 | CHANGE d23 | | |
| 24 | 26.8747 | 0.55 | 1.88300 | 40.8 |
| 25 | 7.9771 | CHANGE d25 | | |
| 26 | ∞ | 0.80 | 1.51680 | 64.2 |
| 27 | ∞ | | | |

TABLE 2

EXAMPLE 1 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.12 | 0.300 | 6.959 | 5.586 | 3.495 | 6.165 |
| 11.70 | 3.621 | 3.638 | 2.512 | 3.110 | 9.624 |
| 24.11 | 6.252 | 1.007 | 1.533 | 1.387 | 12.326 |

TABLE 3

EXAMPLE 1 ASPHERIC COEFFICIENT

| Si | KA | A3 | A4 | A5 | A6 |
|---|---|---|---|---|---|
| 7 | −4.2463436 | 9.1629539E−05 | 5.5507341E−04 | 2.8464141E−05 | 2.8238916E−06 |
| 8 | −17.1271983 | 4.6920703E−04 | −7.4698841E−04 | 2.9697594E−04 | −2.5076085E−05 |
| 14 | −11.9702163 | 1.4964262E−03 | −8.7574597E−04 | 3.7058426E−03 | −2.1956549E−03 |
| 15 | −29.9007096 | −1.4532652E−04 | 4.5455915E−05 | 3.7032337E−04 | −2.7886502E−04 |
| 17 | −5.9823112 | 5.2075552E−04 | 1.4703937E−03 | 8.3416028E−04 | −5.4989164E−04 |
| 18 | −29.9939029 | 3.7028368E−04 | −8.3803740E−05 | 2.0956228E−04 | −9.2845560E−05 |
| 22 | 11.0816558 | −7.7523281E−05 | −3.2218609E−03 | 7.7341691E−04 | −3.4392470E−04 |
| 23 | −6.8879436 | 7.1783614E−04 | −5.4396169E−03 | 2.4009653E−03 | −7.5190875E−04 |

| Si | A7 | A8 | A9 | A10 | A11 |
|---|---|---|---|---|---|
| 7 | −2.8191248E−06 | −4.4754644E−07 | 1.1337229E−08 | 1.3168385E−08 | 3.6227213E−09 |
| 8 | −4.8825361E−06 | −5.2520737E−07 | 4.3953625E−08 | 4.1959305E−08 | 1.0271787E−08 |
| 14 | 3.0820327E−04 | 4.2046733E−04 | −2.3179256E−04 | 6.8893225E−06 | 2.5686708E−05 |
| 15 | 2.5321631E−05 | 1.8342620E−05 | 3.6609449E−06 | 2.2993225E−07 | −9.9085812E−08 |
| 17 | 1.4986387E−04 | −1.1025859E−05 | 1.3501542E−06 | 1.0407971E−07 | −2.7592507E−06 |
| 18 | 1.2473898E−04 | −1.8161108E−05 | −2.2802841E−05 | 4.5589606E−06 | 1.2129906E−06 |
| 22 | −4.4225077E−05 | 2.9211539E−05 | 1.6654389E−05 | −5.5159264E−06 | −1.1774564E−06 |
| 23 | 5.0786739E−05 | 3.0328812E−05 | 6.3286945E−06 | 3.0207486E−07 | −2.7451611E−06 |

| Si | A12 | A13 | A14 | A15 | A16 |
|---|---|---|---|---|---|
| 7 | 5.0583726E−10 | −8.1980864E−11 | −3.7592395E−11 | −5.5645324E−12 | 1.2272928E−12 |
| 8 | 1.2924099E−09 | −2.8761583E−10 | −1.9456675E−10 | −3.9060645E−11 | 1.2448311E−11 |
| 14 | −5.4240080E−06 | | | | |
| 15 | −4.6664161E−08 | | | | |
| 17 | 9.2806803E−07 | | | | |
| 18 | −1.3784489E−07 | | | | |
| 22 | 3.7892562E−07 | | | | |
| 23 | 5.6501311E−07 | | | | |

TABLE 4

EXAMPLE 2 BASIC LENS DATA
f = 5.15~24.26, Fno. = 4.0~5.3, 2ω = 79.6~17.2

| Si | Ri | Di | Ndj | vdj |
|---|---|---|---|---|
| 1 | −200.9071 | 0.60 | 1.92286 | 20.9 |
| 2 | 16.8789 | 1.33 | | |
| 3 | ∞ | 9.95 | 1.78472 | 25.7 |
| 4 | ∞ | 0.04 | | |
| 5 | ∞ | 1.50 | 1.60300 | 65.4 |
| 6 | −22.7086 | 0.10 | | |
| 7* | 9.4633 | 2.15 | 1.56865 | 58.6 |
| 8* | −23.3105 | CHANGE d8 | | |
| 9 | −27.3368 | 0.55 | 1.88300 | 40.8 |
| 10 | 4.8658 | 0.59 | | |
| 11 | 14.8049 | 2.14 | 1.84666 | 23.8 |
| 12 | −6.0339 | 0.53 | 1.88300 | 40.8 |
| 13 | 9.2956 | 0.30 | | |
| 14* | 33.0978 | 0.87 | 1.63355 | 23.6 |
| 15* | −38.5516 | CHANGE d15 | | |
| 16(St) | ∞ | 0.60 | | |
| 17* | 7.1611 | 1.20 | 1.50957 | 56.5 |
| 18* | 61.7972 | CHANGE d18 | | |
| 19 | 5.1116 | 2.99 | 1.48749 | 70.2 |
| 20 | 47.2343 | 0.55 | 2.00069 | 25.5 |
| 21 | 6.1317 | 0.25 | | |
| 22* | 6.2000 | 2.04 | 1.50957 | 56.5 |
| 23* | −7.9452 | CHANGE d23 | | |
| 24 | 26.6869 | 0.55 | 1.88300 | 40.8 |
| 25 | 8.0000 | CHANGE d25 | | |
| 26 | ∞ | 0.83 | 1.51680 | 64.2 |
| 27 | ∞ | | | |

TABLE 5

EXAMPLE 2 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.15 | 0.300 | 6.992 | 5.543 | 3.121 | 6.203 |
| 11.77 | 3.629 | 3.664 | 2.431 | 2.912 | 9.523 |
| 24.26 | 6.278 | 1.014 | 1.301 | 1.410 | 12.155 |

TABLE 6

EXAMPLE 2 ASPHERIC COEFFICIENT

| Si | KA | A3 | A4 | A5 | A6 |
|---|---|---|---|---|---|
| 7 | −9.5186250E−01 | 9.0961975E−05 | −1.0704589E−05 | 6.5223722E−05 | 4.5144732E−06 |
| 8 | −4.2277073E+00 | 4.1749363E−04 | −5.5031774E−04 | 2.4825340E−04 | −1.9718097E−05 |
| 14 | −2.9846153E+01 | 1.8414992E−03 | −1.9304541E−03 | 4.3424343E−03 | −2.4676087E−03 |
| 15 | −4.4409731E+00 | −3.4982125E−04 | 7.4104495E−04 | −4.8738582E−04 | 9.9420805E−05 |
| 17 | −3.3776367E+00 | 7.4161176E−04 | −1.8917295E−04 | 1.2089841E−03 | −5.2870156E−04 |
| 18 | −9.1073717E+00 | 7.5654380E−04 | −7.6418225E−04 | 5.1312596E−04 | −1.1330217E−04 |
| 22 | 3.0328266E+00 | 5.3042946E−04 | −4.1609003E−03 | 1.1809459E−03 | −4.4804033E−04 |
| 23 | −3.8760270E+00 | 1.1407041E−03 | −2.9914283E−03 | 2.1950836E−03 | −7.8203866E−04 |

| Si | A7 | A8 | A9 | A10 | A11 |
|---|---|---|---|---|---|
| 7 | −2.4861034E−06 | −4.3691819E−07 | 8.2507243E−09 | 1.2265328E−08 | 3.4320974E−09 |
| 8 | −4.7483415E−06 | −5.4518706E−07 | 3.9069001E−08 | 4.1164861E−08 | 1.0152717E−08 |
| 14 | 3.3834374E−04 | 4.3432447E−04 | −2.3142509E−04 | 6.0413594E−06 | 2.5330802E−05 |
| 15 | 1.8576114E−05 | 1.5729591E−06 | 9.6442444E−08 | 4.8855188E−09 | 2.1527672E−10 |
| 17 | 1.3788469E−04 | −1.1725623E−05 | 1.3752628E−06 | 1.3659147E−07 | −2.7533107E−06 |
| 18 | 1.1536109E−04 | −1.8619568E−05 | −2.2683128E−05 | 4.5963358E−06 | 1.2201476E−06 |
| 22 | −5.3115275E−05 | 2.7073967E−05 | 1.6112262E−05 | −5.6399376E−06 | −1.1986254E−06 |
| 23 | 4.1417194E−05 | 2.8833373E−05 | 6.2527745E−06 | 3.3285949E−07 | −2.7348379E−06 |

| Si | A12 | A13 | A14 | A15 | A16 |
|---|---|---|---|---|---|
| 7 | 4.7219852E−10 | −8.7250135E−11 | −3.8334240E−11 | −5.6611007E−12 | 1.2155553E−12 |
| 8 | 1.2739032E−09 | −2.9066878E−10 | −1.9509180E−10 | −3.9150764E−11 | 1.2433228E−11 |
| 14 | −5.5224600E−06 | | | | |
| 15 | 8.3998834E−12 | | | | |
| 17 | 9.2883525E−07 | | | | |
| 18 | −1.3671688E−07 | | | | |
| 22 | 3.7579341E−07 | | | | |
| 23 | 5.6717290E−07 | | | | |

TABLE 7

EXAMPLE 3 BASIC LENS DATA
f = 5.14~24.22, Fno. = 4.1~5.4, 2ω = 80.0~17.4

| Si | Ri | Di | Ndj | vdj |
|---|---|---|---|---|
| 1 | −200.0000 | 0.60 | 1.92286 | 20.9 |
| 2 | 16.0654 | 1.33 | | |
| 3 | ∞ | 9.95 | 1.78590 | 44.2 |
| 4 | ∞ | 0.04 | | |
| 5 | ∞ | 1.50 | 1.60300 | 65.4 |
| 6 | −19.8630 | 0.10 | | |
| 7* | 9.7817 | 2.00 | 1.56865 | 58.6 |
| 8* | −29.1169 | CHANGE d8 | | |
| 9 | −24.9813 | 0.54 | 1.88300 | 40.8 |
| 10 | 4.7270 | 0.47 | | |
| 11 | 9.8180 | 2.27 | 1.84666 | 23.8 |
| 12 | −5.1500 | 0.53 | 1.88300 | 40.8 |
| 13 | 10.3083 | 0.30 | | |
| 14* | −30.6477 | 0.87 | 1.50957 | 56.5 |
| 15* | −15.6770 | CHANGE d15 | | |
| 16(St) | ∞ | 0.60 | | |
| 17* | 7.1973 | 1.20 | 1.50957 | 56.5 |
| 18* | 66.9432 | CHANGE d18 | | |
| 19 | 5.1012 | 3.05 | 1.48749 | 70.2 |
| 20 | 57.4813 | 0.55 | 2.00069 | 25.5 |
| 21 | 6.0790 | 0.25 | | |
| 22* | 5.9150 | 2.02 | 1.50957 | 56.5 |
| 23* | −8.3039 | CHANGE d23 | | |
| 24 | 27.7933 | 0.55 | 1.88300 | 40.8 |
| 25 | 8.0000 | CHANGE d25 | | |
| 26 | ∞ | 0.83 | 1.51680 | 64.2 |
| 27 | ∞ | | | |

TABLE 8

EXAMPLE 3 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.14 | 0.300 | 7.338 | 5.648 | 2.930 | 6.161 |
| 11.75 | 3.833 | 3.805 | 2.445 | 2.754 | 9.539 |
| 24.22 | 6.612 | 1.025 | 1.043 | 1.419 | 12.277 |

TABLE 9

EXAMPLE 3 ASPHERIC COEFFICIENT

| Si | KA | A3 | A4 | A5 | A6 |
|---|---|---|---|---|---|
| 7 | −1.1272629 | 1.8745107E−04 | −5.0123984E−05 | 6.4405544E−05 | 5.9791606E−06 |
| 8 | −0.1481100 | 5.0695474E−04 | −6.0267980E−04 | 2.4335514E−04 | −1.7028258E−05 |
| 14 | −26.6504362 | 1.7572809E−03 | 1.1815245E−04 | 3.6830961E−03 | −2.5480215E−03 |
| 15 | −13.2509059 | −1.1539163E−04 | 2.0196714E−03 | −3.4049277E−03 | 3.0189443E−03 |
| 17 | −0.5905181 | 2.4218576E−04 | −1.8281464E−04 | 1.5031134E−04 | 7.4970402E−06 |
| 18 | −9.0225102 | 1.9808610E−04 | −3.9506247E−04 | 3.4509416E−04 | −7.5861809E−05 |
| 22 | 1.9594599 | 1.0475101E−03 | −4.4640163E−03 | 1.5214792E−03 | −5.5155168E−04 |
| 23 | −1.8716757 | 1.5715338E−03 | −2.4994536E−03 | 1.8133507E−03 | −4.6367799E−04 |

| Si | A7 | A8 | A9 | A10 | A11 |
|---|---|---|---|---|---|
| 7 | −1.9751737E−06 | −4.2960890E−07 | −2.4516723E−08 | 9.7462311E−09 | 3.2881291E−09 |
| 8 | −4.0478586E−06 | −4.7443653E−07 | 1.9486713E−08 | 2.8974456E−08 | 7.5473112E−09 |
| 14 | 6.2223403E−04 | 3.9220080E−04 | −3.0528433E−04 | 3.5869779E−05 | 2.7335800E−05 |
| 15 | −9.0283751E−04 | −3.1471918E−04 | 1.5713172E−04 | 8.1528209E−05 | −5.1096908E−05 |
| 17 | 2.1506648E−06 | 1.7798298E−07 | 1.4636440E−08 | 1.2563042E−09 | 1.0101439E−10 |
| 18 | 7.9795413E−06 | 1.6268683E−06 | 1.4839442E−07 | 1.0039219E−08 | 5.7586455E−10 |
| 22 | 2.3519428E−05 | 1.3868629E−05 | 8.4648886E−06 | −2.6002510E−06 | −1.2834080E−06 |
| 23 | −5.8520647E−05 | 3.3304250E−05 | 8.0860025E−06 | 1.7361622E−06 | −3.5015139E−06 |

| Si | A12 | A13 | A14 | A15 | A16 |
|---|---|---|---|---|---|
| 7 | 6.0326041E−10 | −5.8020955E−11 | −3.4870894E−11 | −6.3685481E−12 | 1.2427995E−12 |
| 8 | 1.0322259E−09 | −1.5731760E−10 | −1.2940340E−10 | −2.9567870E−11 | 8.3084615E−12 |
| 14 | −7.2901763E−06 | | | | |
| 15 | 6.8472880E−06 | | | | |
| 17 | 7.4497826E−12 | | | | |
| 18 | 2.9510257E−11 | | | | |
| 22 | 3.5973041E−07 | | | | |
| 23 | 6.6836112E−07 | | | | |

TABLE 10

EXAMPLE 4 BASIC LENS DATA
f = 5.15~24.25, Fno. = 4.0~5.2, 2ω = 79.8~17.2

| Si | Ri | Di | Ndj | vdj |
|---|---|---|---|---|
| 1 | −200.0000 | 0.70 | 1.92286 | 20.9 |
| 2 | 16.3201 | 1.35 | | |
| 3 | ∞ | 10.05 | 1.78590 | 44.2 |
| 4 | ∞ | 0.04 | | |
| 5 | ∞ | 1.52 | 1.60300 | 65.4 |
| 6 | −19.0352 | 0.10 | | |
| 7* | 10.0322 | 2.00 | 1.59170 | 60.7 |
| 8* | −32.6657 | CHANGE d8 | | |
| 9 | −26.8505 | 0.58 | 1.88300 | 40.8 |
| 10 | 5.5232 | 0.70 | | |
| 11 | 26.9523 | 2.00 | 1.92286 | 20.9 |
| 12 | −5.7048 | 0.52 | 1.88300 | 40.8 |
| 13 | 9.6620 | 0.15 | | |
| 14* | 11.1617 | 0.87 | 1.50957 | 56.5 |
| 15* | 27.9489 | CHANGE d15 | | |
| 16(St) | ∞ | 0.60 | | |
| 17* | 7.3686 | 1.20 | 1.50957 | 56.5 |
| 18* | 85.6465 | CHANGE d18 | | |
| 19 | 5.1666 | 3.72 | 1.48749 | 70.2 |
| 20 | −115.3627 | 0.55 | 2.00069 | 25.5 |

TABLE 10-continued

EXAMPLE 4 BASIC LENS DATA
f = 5.15~24.25, Fno. = 4.0~5.2, 2ω = 79.8~17.2

| Si | Ri | Di | Ndj | vdj |
|---|---|---|---|---|
| 21 | 6.7515 | 0.25 | | |
| 22* | 5.4886 | 2.04 | 1.50957 | 56.5 |
| 23* | −8.4975 | CHANGE d23 | | |
| 24 | 31.4176 | 0.55 | 1.88300 | 40.8 |
| 25 | 8.0000 | CHANGE d25 | | |
| 26 | ∞ | 0.83 | 1.51680 | 64.2 |
| 27 | ∞ | | | |

TABLE 11

EXAMPLE 4 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.15 | 0.300 | 7.177 | 5.418 | 2.362 | 6.483 |
| 11.76 | 3.751 | 3.726 | 2.396 | 2.487 | 9.380 |
| 24.25 | 6.436 | 1.041 | 1.184 | 1.406 | 11.673 |

TABLE 12

EXAMPLE 4 ASPHERIC COEFFICIENT

| Si | KA | A3 | A4 | A5 | A6 |
|---|---|---|---|---|---|
| 7 | −2.3244200 | 3.7877042E−04 | 6.0907190E−05 | 5.3251741E−05 | 5.6832257E−06 |
| 8 | 3.3286131 | 7.4327677E−04 | −6.3291191E−04 | 2.2611313E−04 | −1.3805425E−05 |
| 14 | −25.5278811 | 1.2350185E−03 | 2.9115709E−04 | 3.3085945E−03 | −2.5680426E−03 |
| 15 | −25.0751464 | −3.3517469E−04 | 9.8581110E−04 | −3.2719417E−03 | 3.0213684E−03 |
| 17 | −4.0322114 | 1.5545582E−04 | 1.0235952E−03 | −2.9673450E−05 | 1.6033067E−05 |
| 18 | 0.1211390 | −1.8801214E−05 | −9.7302036E−05 | 1.0121496E−04 | −1.7941339E−05 |
| 22 | 0.2287088 | 9.2915646E−04 | −3.5513275E−03 | 1.4959163E−03 | −5.3751254E−04 |
| 23 | −2.1035648 | 1.4874373E−03 | −2.1831261E−03 | 1.8055310E−03 | −4.6591447E−04 |

| Si | A7 | A8 | A9 | A10 | A11 |
|---|---|---|---|---|---|
| 7 | −1.9218208E−06 | −4.1674516E−07 | −2.2350814E−08 | 9.9958505E−09 | 3.3101195E−09 |
| 8 | −3.8047424E−06 | −4.7752927E−07 | 1.6443066E−08 | 2.8555688E−08 | 7.5083540E−09 |
| 14 | 6.2053520E−04 | 3.9181008E−04 | −3.0534020E−04 | 3.5864653E−05 | 2.7335387E−05 |
| 15 | −9.0192224E−04 | −3.1429948E−04 | 1.5719458E−04 | 8.1535142E−05 | −5.1096412E−05 |
| 17 | 2.6681513E−07 | −9.0569175E−08 | −8.4365451E−09 | −3.6932459E−10 | −1.7671561E−12 |
| 18 | 5.1352823E−06 | 8.2895956E−07 | 7.1057149E−08 | 4.6499787E−09 | 2.5907282E−10 |
| 22 | 3.0070242E−05 | 1.4540848E−05 | 8.4681737E−06 | −2.5981710E−06 | −1.2833413E−06 |
| 23 | −5.8966101E−05 | 3.3262808E−05 | 8.0836664E−06 | 1.7344766E−06 | −3.5015470E−06 |

| Si | A12 | A13 | A14 | A15 | A16 |
|---|---|---|---|---|---|
| 7 | 6.0489342E−10 | −5.7909451E−11 | −3.4864385E−11 | −6.3681432E−12 | 1.2428209E−12 |
| 8 | 1.0292197E−09 | −1.5752334E−10 | −1.2941576E−10 | −2.9568584E−11 | 8.3084225E−12 |
| 14 | −7.2902038E−06 | | | | |
| 15 | 6.8473222E−06 | | | | |
| 17 | 1.2396868E−12 | | | | |
| 18 | 1.2907091E−11 | | | | |
| 22 | 3.5973279E−07 | | | | |
| 23 | 6.6836215E−07 | | | | |

TABLE 13

EXAMPLE 5 BASIC LENS DATA
f = 5.16~24.3, Fno. = 4.0~5.0, 2ω = 79.8~17.0

| Si | Ri | Di | Ndj | vdj |
|---|---|---|---|---|
| 1 | −449.4240 | 0.60 | 2.00272 | 19.3 |
| 2 | 16.6356 | 1.33 | | |
| 3 | ∞ | 9.95 | 1.78472 | 25.7 |
| 4 | ∞ | 0.04 | | |
| 5 | ∞ | 1.45 | 1.59522 | 67.7 |
| 6 | −23.5358 | 0.10 | | |
| 7* | 9.3472 | 2.23 | 1.56865 | 58.6 |
| 8* | −20.0000 | CHANGE d8 | | |
| 9 | −24.9996 | 0.55 | 1.80400 | 46.6 |
| 10 | 4.8184 | 0.59 | | |
| 11 | 27.0329 | 2.14 | 1.94595 | 18.0 |
| 12 | −5.9017 | 0.53 | 2.00100 | 29.1 |
| 13 | 22.7045 | 0.30 | | |
| 14* | 37.5945 | 0.87 | 1.63355 | 23.6 |
| 15* | 31.7242 | CHANGE d15 | | |
| 16(St) | ∞ | 0.60 | | |
| 17* | 7.0008 | 1.20 | 1.50957 | 56.5 |
| 18* | 50.9106 | CHANGE d18 | | |
| 19 | 5.5315 | 3.31 | 1.48749 | 70.2 |
| 20 | −22.1501 | 0.50 | 2.00330 | 28.3 |

TABLE 13-continued

EXAMPLE 5 BASIC LENS DATA
f = 5.16~24.3, Fno. = 4.0~5.0, 2ω = 79.8~17.0

| Si | Ri | Di | Ndj | vdj |
|---|---|---|---|---|
| 21 | 10.0000 | 0.25 | | |
| 22* | 9.9615 | 1.90 | 1.50957 | 56.5 |
| 23* | −6.5116 | CHANGE d23 | | |
| 24 | 25.6838 | 0.55 | 1.90366 | 31.3 |
| 25 | 8.0067 | CHANGE d25 | | |
| 26 | ∞ | 0.83 | 1.51680 | 64.2 |
| 27 | ∞ | | | |

TABLE 14

EXAMPLE 5 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.16 | 0.300 | 6.959 | 5.052 | 3.394 | 6.349 |
| 11.79 | 3.594 | 3.665 | 2.223 | 3.336 | 9.236 |
| 24.30 | 6.262 | 0.997 | 1.867 | 1.620 | 11.308 |

TABLE 15

EXAMPLE 5 ASPHERIC COEFFICIENT

| Si | KA | A3 | A4 | A5 | A6 |
|---|---|---|---|---|---|
| 7 | −4.0760255 | 1.2443922E−04 | 5.3698517E−04 | 2.0005950E−05 | 3.1487317E−06 |
| 8 | −24.2007673 | 5.3651718E−04 | −9.1548336E−04 | 2.8797331E−04 | −2.0009900E−05 |
| 14 | −29.9865347 | 1.5440893E−03 | −1.2657333E−03 | 3.9673634E−03 | −2.2210559E−03 |
| 15 | −10.1612427 | −2.9827984E−04 | 6.8481218E−04 | 6.5788706E−04 | −3.7778259E−04 |
| 17 | −7.8162289 | 4.1917132E−04 | 2.2264640E−03 | 5.7205028E−04 | −5.2335851E−04 |
| 18 | −21.3620279 | 4.3007463E−04 | −2.9174431E−04 | 2.3962329E−04 | −9.2618964E−05 |
| 22 | 7.9949193 | −2.3287360E−04 | −3.3053884E−03 | 6.6941041E−04 | −3.2144714E−04 |
| 23 | −6.2606988 | 4.8864445E−04 | −4.7649797E−03 | 2.2674294E−03 | −7.7192282E−04 |

| Si | A7 | A8 | A9 | A10 | A11 |
|---|---|---|---|---|---|
| 7 | −2.6849043E−06 | −4.2574195E−07 | 1.3775848E−08 | 1.3388652E−08 | 3.6398745E−09 |
| 8 | −4.5935894E−06 | −5.3732509E−07 | 4.0454806E−08 | 4.1578901E−08 | 1.0240844E−08 |
| 14 | 2.8609628E−04 | 4.1800294E−04 | −2.3196289E−04 | 6.8798154E−06 | 2.5686057E−05 |
| 15 | 2.3026283E−05 | 1.8557978E−05 | 3.6750938E−06 | 2.2985745E−07 | −9.9161060E−08 |
| 17 | 1.5085879E−04 | −1.1070921E−05 | 1.3429261E−06 | 1.0360849E−07 | −2.7592558E−06 |
| 18 | 1.2488413E−04 | −1.8195721E−05 | −2.2808113E−05 | 4.5585655E−06 | 1.2129696E−06 |
| 22 | −4.6923166E−05 | 2.8807353E−05 | 1.6624631E−05 | −5.5175969E−06 | −1.1775476E−06 |
| 23 | 5.5341016E−05 | 3.0992963E−05 | 6.3805681E−06 | 3.0513533E−07 | −2.7450002E−06 |

| Si | A12 | A13 | A14 | A15 | A16 |
|---|---|---|---|---|---|
| 7 | 5.0698379E−10 | −8.1908522E−11 | −3.7588592E−11 | −5.5643776E−12 | 1.2272933E−12 |
| 8 | 1.2902538E−09 | −2.8774996E−10 | −1.9457495E−10 | −3.9061153E−11 | 1.2448272E−11 |
| 14 | −5.4240987E−06 | | | | |
| 15 | −4.6662791E−08 | | | | |
| 17 | 9.2807160E−07 | | | | |
| 18 | −1.3784632E−07 | | | | |
| 22 | 3.7892013E−07 | | | | |
| 23 | 5.6502124E−07 | | | | |

TABLE 16

EXAMPLE 6 BASIC LENS DATA
f = 5.10~24.05, Fno. = 4.0~5.1, 2ω = 80.2~17.4

| Si | Ri | Di | Ndj | vdj |
|---|---|---|---|---|
| 1 | −150.0693 | 0.60 | 1.92286 | 20.9 |
| 2 | 16.0359 | 1.33 | | |
| 3 | ∞ | 9.95 | 1.78472 | 25.7 |
| 4 | ∞ | 0.04 | | |
| 5 | ∞ | 1.45 | 1.59522 | 67.7 |
| 6 | −21.7942 | 0.10 | | |
| 7* | 9.2585 | 2.26 | 1.56865 | 58.6 |
| 8* | −22.0486 | CHANGE d8 | | |
| 9 | −34.9838 | 0.55 | 1.91082 | 35.2 |
| 10 | 4.8184 | 0.59 | | |
| 11 | 25.5861 | 2.13 | 1.92286 | 20.9 |
| 12 | −5.9133 | 0.54 | 1.88300 | 40.8 |
| 13 | 13.2160 | 0.30 | | |
| 14* | 12.8997 | 0.87 | 1.63355 | 23.6 |
| 15* | 23.1711 | CHANGE d15 | | |
| 16(St) | ∞ | 0.60 | | |
| 17* | 7.0670 | 1.20 | 1.50957 | 56.5 |
| 18* | 58.8255 | CHANGE d18 | | |
| 19 | 5.7062 | 2.69 | 1.43700 | 95.0 |
| 20 | 3363.2947 | 0.50 | 2.00069 | 25.5 |
| 21 | 10.0001 | 0.25 | | |
| 22* | 11.9010 | 1.84 | 1.50957 | 56.5 |
| 23* | −6.7826 | CHANGE d23 | | |
| 24 | 21.0982 | 0.55 | 2.00100 | 29.1 |
| 25 | 8.0011 | CHANGE d25 | | |
| 26 | ∞ | 0.83 | 1.51680 | 64.2 |
| 27 | ∞ | | | |

TABLE 17

EXAMPLE 6 DISTANCE BETWEEN GROUPS

| FOCAL LENGTH | CHANGE d8 | CHANGE d15 | CHANGE d18 | CHANGE d23 | CHANGE d25 |
|---|---|---|---|---|---|
| 5.10 | 0.300 | 6.959 | 5.477 | 3.730 | 6.192 |
| 11.66 | 3.606 | 3.653 | 2.427 | 3.262 | 9.710 |
| 24.05 | 6.282 | 0.977 | 1.655 | 1.351 | 12.393 |

TABLE 18

EXAMPLE 6 ASPHERIC COEFFICIENT

| Si | KA | A3 | A4 | A5 | A6 |
|---|---|---|---|---|---|
| 7 | −3.7641508 | 2.8752302E−04 | 3.9614784E−04 | 4.6338461E−05 | 3.5834002E−06 |
| 8 | −19.0461681 | 7.2655742E−04 | −9.2711221E−04 | 3.2202286E−04 | −2.5628604E−05 |
| 14 | −30.0000007 | 1.6871610E−03 | −3.1343122E−05 | 3.7264481E−03 | −2.1997922E−03 |
| 15 | −28.6586719 | −2.3647595E−05 | 3.9929785E−04 | 5.5263664E−04 | −2.5994607E−04 |
| 17 | −9.7072297 | 3.1369238E−04 | 3.2330489E−03 | 3.3032644E−04 | −5.2539537E−04 |
| 18 | −8.5680791 | 4.6490500E−04 | −9.4313324E−05 | 2.2033257E−04 | −8.7792909E−05 |
| 22 | 11.0376717 | 1.0051334E−04 | −3.1108026E−03 | 9.0049355E−04 | −3.7881750E−04 |
| 23 | −9.7500698 | 7.4215180E−04 | −6.2511258E−03 | 2.6771190E−03 | −7.5950525E−04 |

| Si | A7 | A8 | A9 | A10 | A11 |
|---|---|---|---|---|---|
| 7 | −2.8943931E−06 | −4.5685591E−07 | 1.0977944E−08 | 1.3194579E−08 | 3.6320675E−09 |
| 8 | −4.8760587E−06 | −5.2274751E−07 | 4.3594164E−08 | 4.1877516E−08 | 1.0259140E−08 |
| 14 | 2.9812795E−04 | 4.1866337E−04 | −2.3207040E−04 | 6.8658085E−06 | 2.5688743E−05 |
| 15 | 2.3701304E−05 | 1.7791325E−05 | 3.4239069E−06 | 1.4222462E−07 | −1.2298020E−07 |
| 17 | 1.5369219E−04 | −1.0902705E−05 | 1.3245188E−06 | 9.7838076E−08 | −2.7603726E−06 |
| 18 | 1.2470040E−04 | −1.8371880E−05 | −2.2875496E−05 | 4.5444578E−06 | 1.2098981E−06 |
| 22 | −4.3830014E−05 | 2.9530131E−05 | 1.6716932E−05 | −5.5064402E−06 | −1.1762161E−06 |
| 23 | 4.6103139E−05 | 2.9697738E−05 | 6.2724415E−06 | 2.9592360E−07 | −2.7459886E−06 |

| Si | A12 | A13 | A14 | A15 | A16 |
|---|---|---|---|---|---|
| 7 | 5.0760122E−10 | −8.1658380E−11 | −3.7537956E−11 | −5.5561667E−12 | 1.2284874E−12 |
| 8 | 1.2901036E−09 | −2.8803038E−10 | −1.9463681E−10 | −3.9071279E−11 | 1.2446835E−11 |
| 14 | −5.4224619E−06 | | | | |
| 15 | −5.2653695E−08 | | | | |
| 17 | 9.2792694E−07 | | | | |
| 18 | −1.3844251E−07 | | | | |
| 22 | 3.7909938E−07 | | | | |
| 23 | 5.6488676E−07 | | | | |

Table 19 shows values corresponding to formulas (1) through (4) in the zoom lenses of Examples 1 through 6. In Examples 1 through 6, d-line is used as a reference wavelength, and Table 19 shows values at the reference wavelength. As table 19 shows, all of Examples 1 through 6 satisfy the formulas (1) through (4).

TABLE 19

| FORMULA | EXAMPLE 1 | EXAMPLE 2 | EXAMPLE 3 | EXAMPLE 4 | EXAMPLE 5 | EXAMPLE 6 |
|---|---|---|---|---|---|---|
| (1) IH/fw | 0.753 | 0.748 | 0.750 | 0.749 | 0.747 | 0.755 |
| (2) \|fG2/fw\| | 0.841 | 0.832 | 0.877 | 0.833 | 0.810 | 0.853 |
| (3) fw/f24 | 0.204 | 0.182 | 0.083 | 0.144 | −0.015 | 0.115 |
| (4) $\dfrac{TL}{fw \times \tan(\omega w)}$ | 12.066 | 12.057 | 12.042 | 12.071 | 12.029 | 12.056 |

Figure 9:
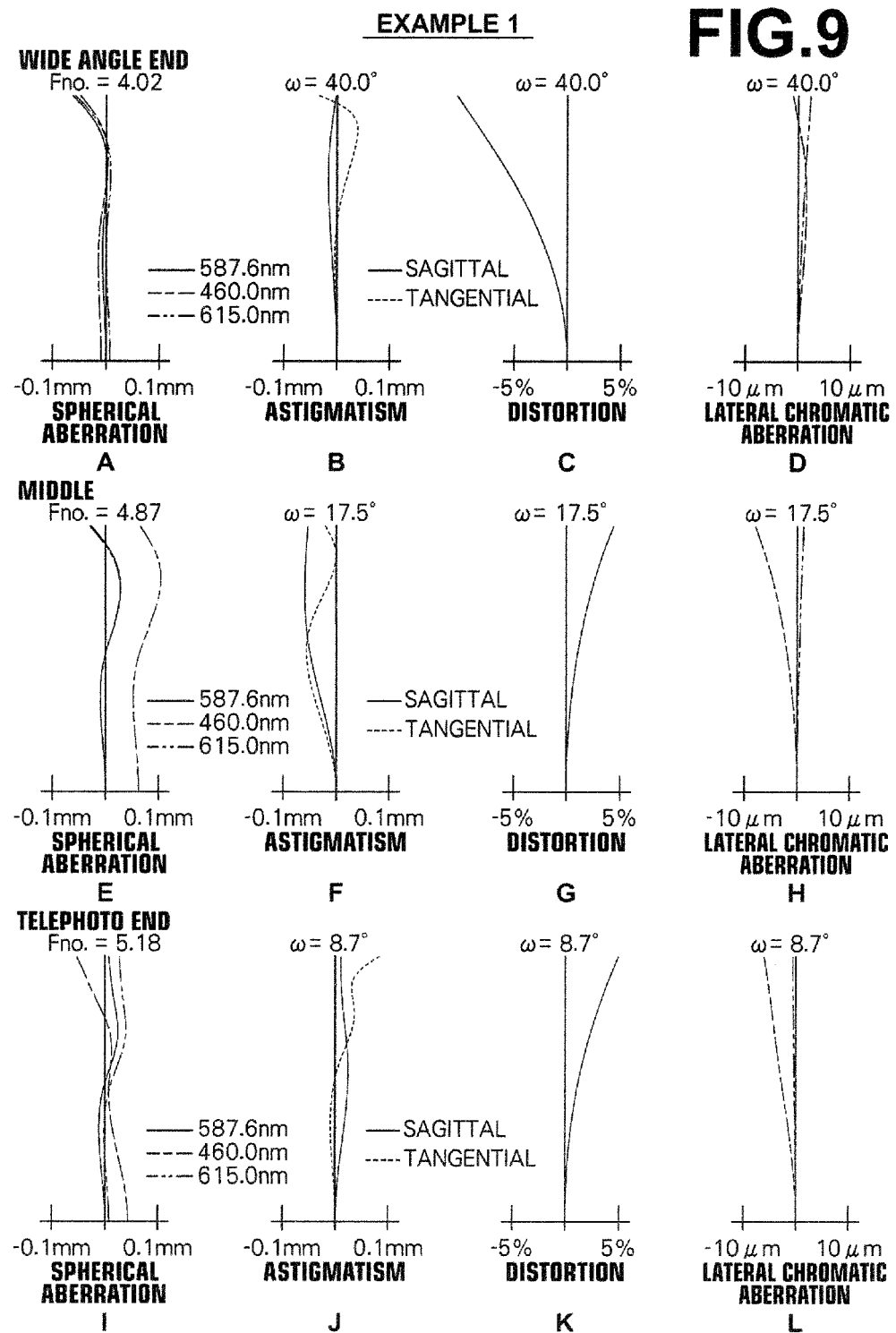
FIG. 9, Sections A through L are aberration diagrams of the zoom lens in Example 1 of the present invention.

FIG. 9, Sections A through D show aberration diagrams of a spherical aberration, astigmatism, distortion (distortion aberration), and a lateral chromatic aberration (a chromatic aberration of magnification) of the zoom lens of Example 1 at a wide angle end, respectively. FIG. 9, Sections E through H show aberration diagrams of a spherical aberration, astigmatism, distortion, and a lateral chromatic aberration of the zoom lens of Example 1 at middle zoom position, respectively. FIG. 9, Sections I through L show aberration diagrams of a spherical aberration, astigmatism, distortion, and a lateral chromatic aberration of the zoom lens of Example 1 at a telephoto end, respectively.

In the diagram of the spherical aberration, aberrations for the wavelength of 587.6 nm, the wavelength of 460.0 nm, and the wavelength of 615.0 nm are indicated by a solid line, a dot dashed line, and a double dot dashed line, respectively. In the diagram of astigmatism, an aberration in a sagittal direction and an aberration in a tangential direction are indicated by a sold line and a broken line, respectively. In the diagram of distortion, an aberration for the wavelength of 587.6 nm is indicated by a solid line. In the diagram of the lateral chromatic aberration, aberrations for the wavelength of 460.0 nm and the wavelength of 615.0 nm are indicated by a dot dashed line and a double dot dashed line, respectively. In the diagram of the spherical aberration, Fno. represents F-number, and in the other aberration diagrams ω represents a half angle of view.

Figure 10:
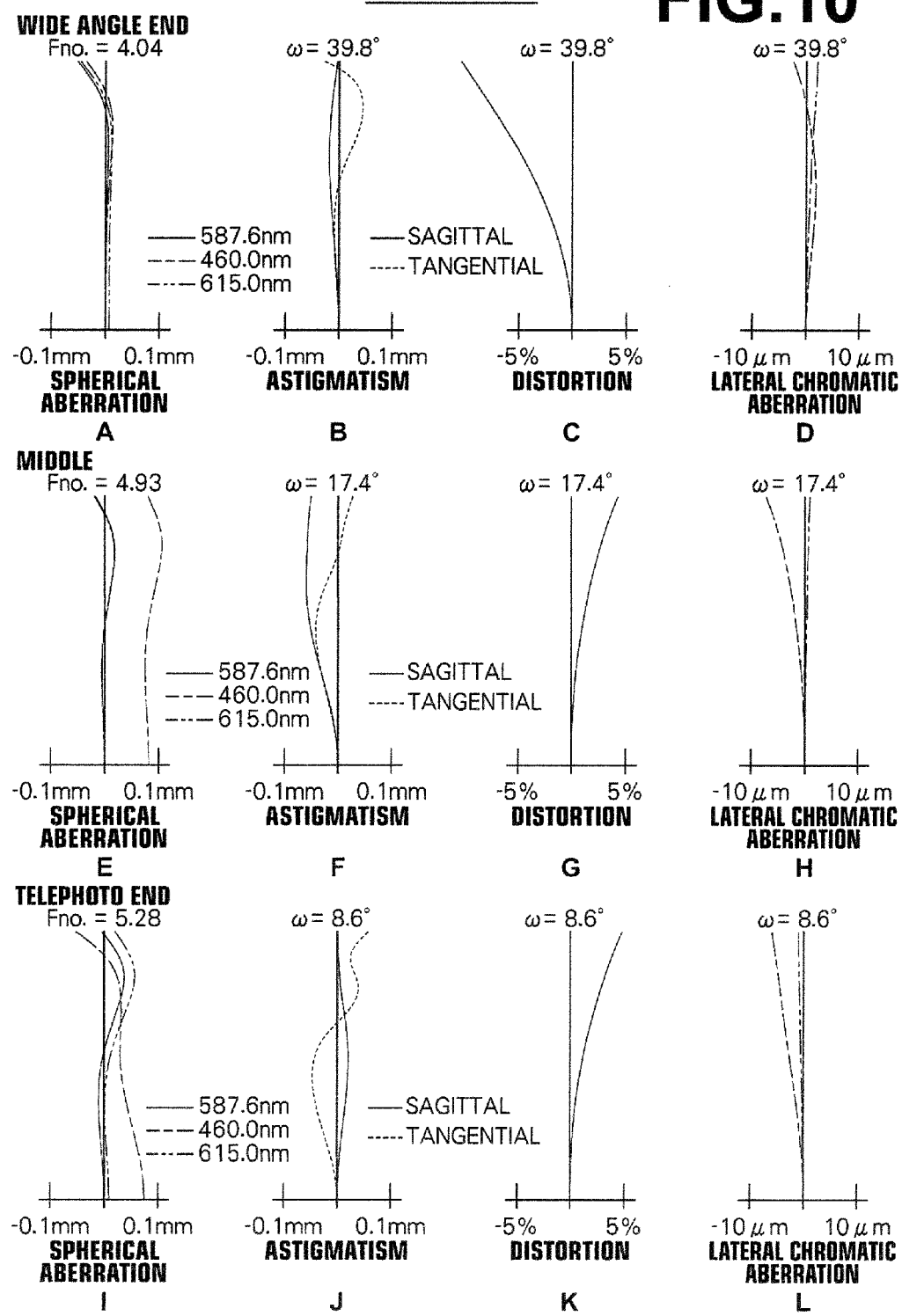
FIG. 10, Sections A through L are aberration diagrams of the zoom lens in Example 2 of the present invention.
Figure 11:
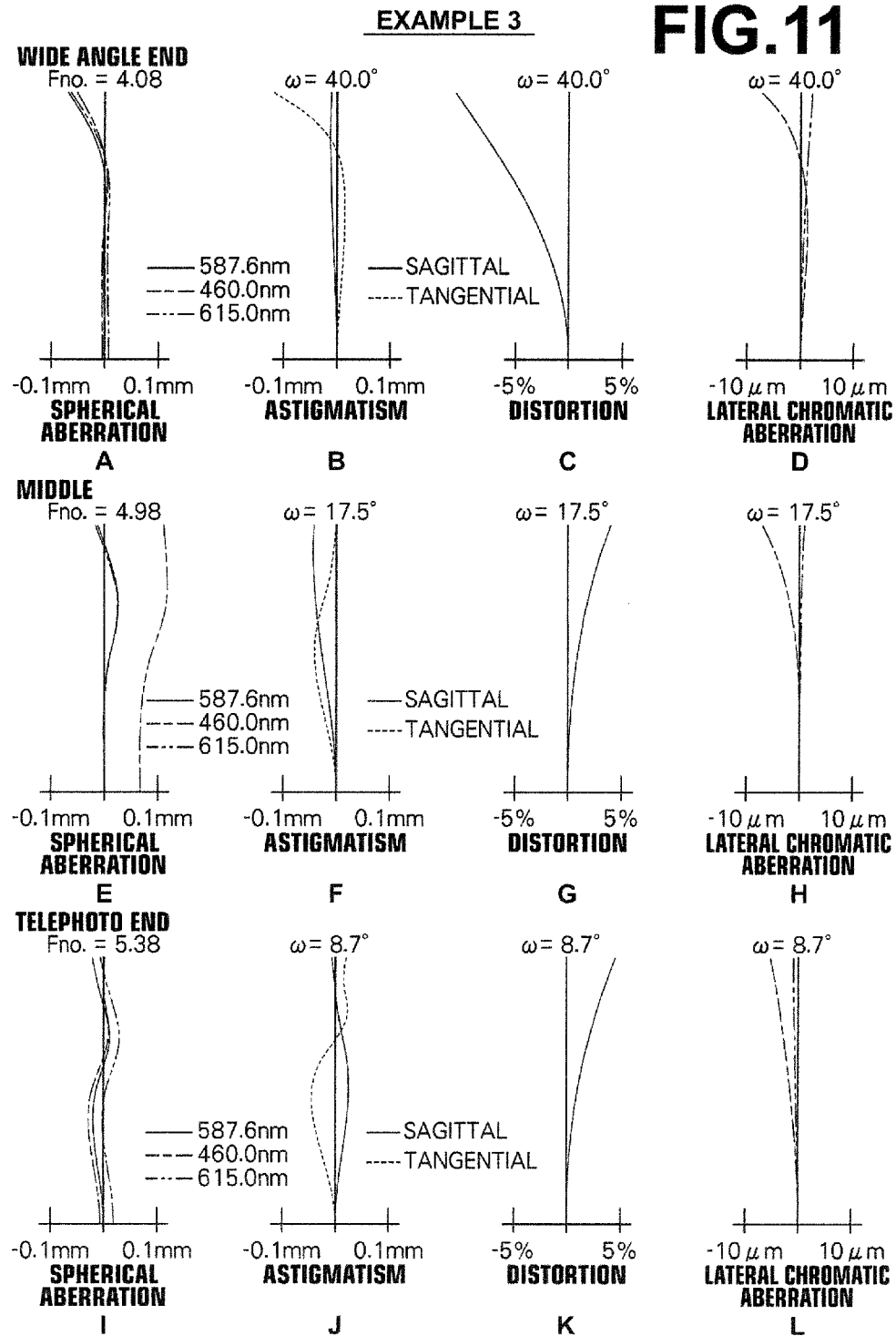
FIG. 11, Sections A through L are aberration diagrams of the zoom lens in Example 3 of the present invention.
Figure 12:
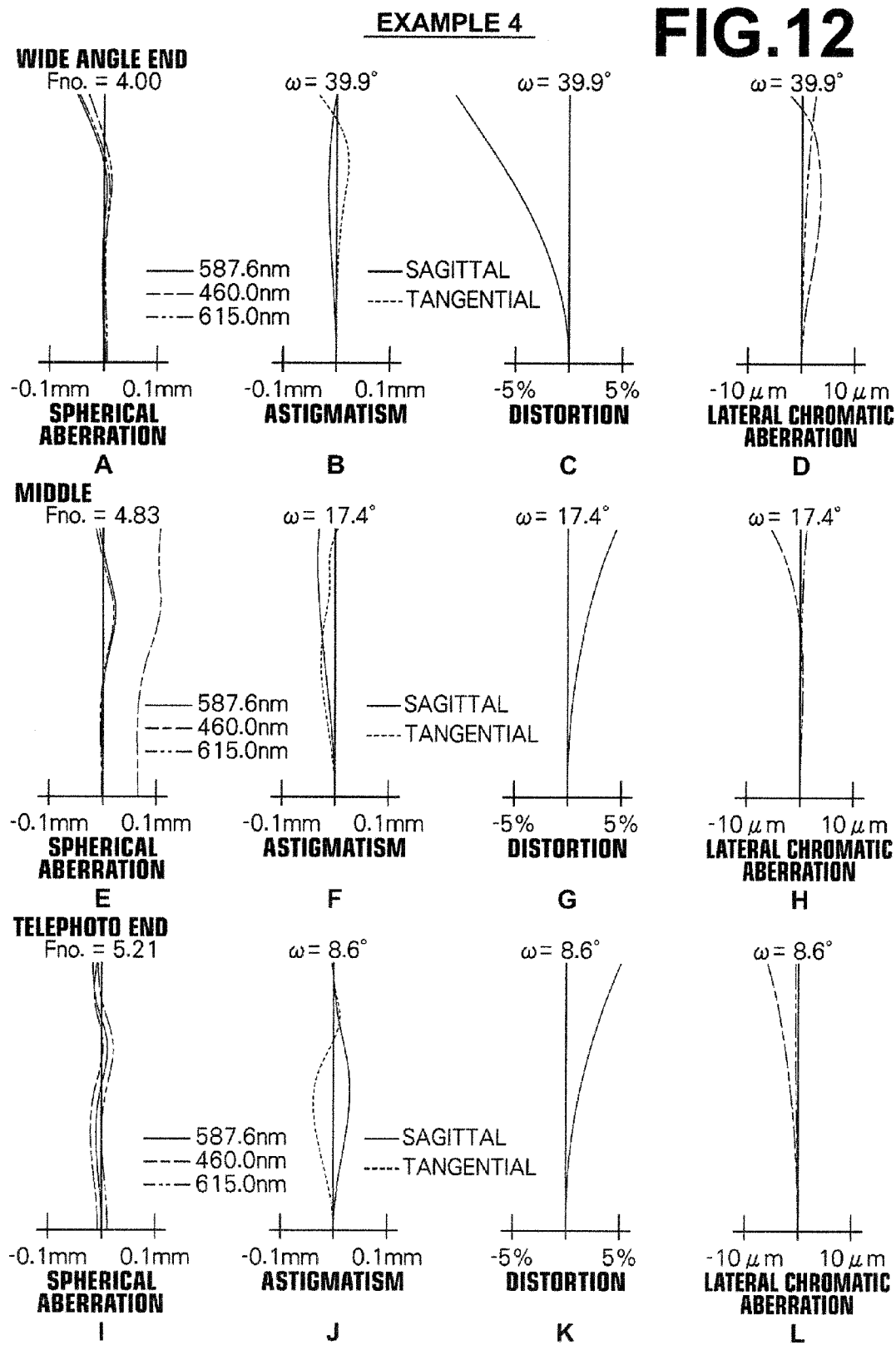
FIG. 12, Sections A through L are aberration diagrams of the zoom lens in Example 4 of the present invention.
Figure 13:
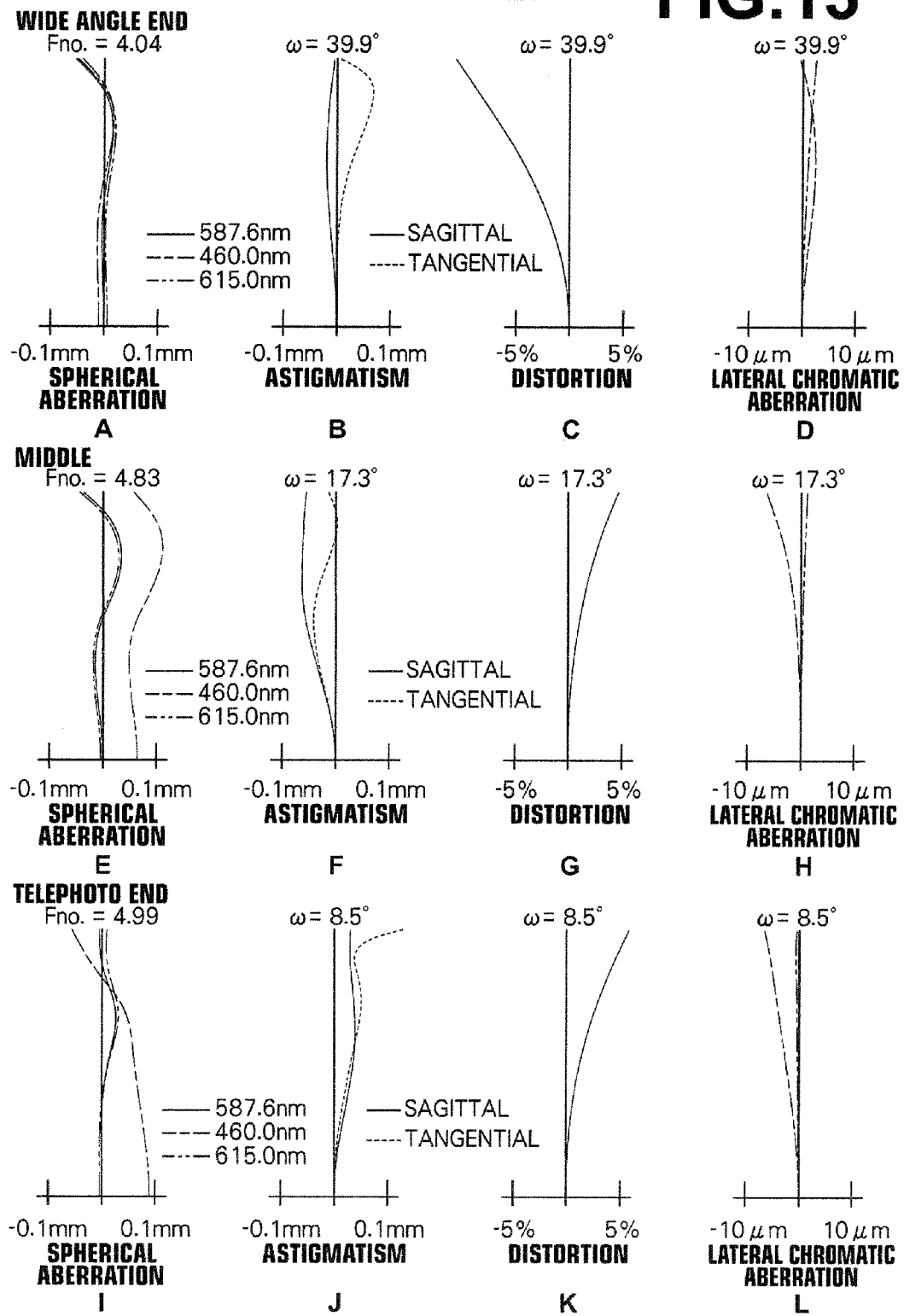
FIG. 13, Sections A through L are aberration diagrams of the zoom lens in Example 5 of the present invention.
Figure 14:
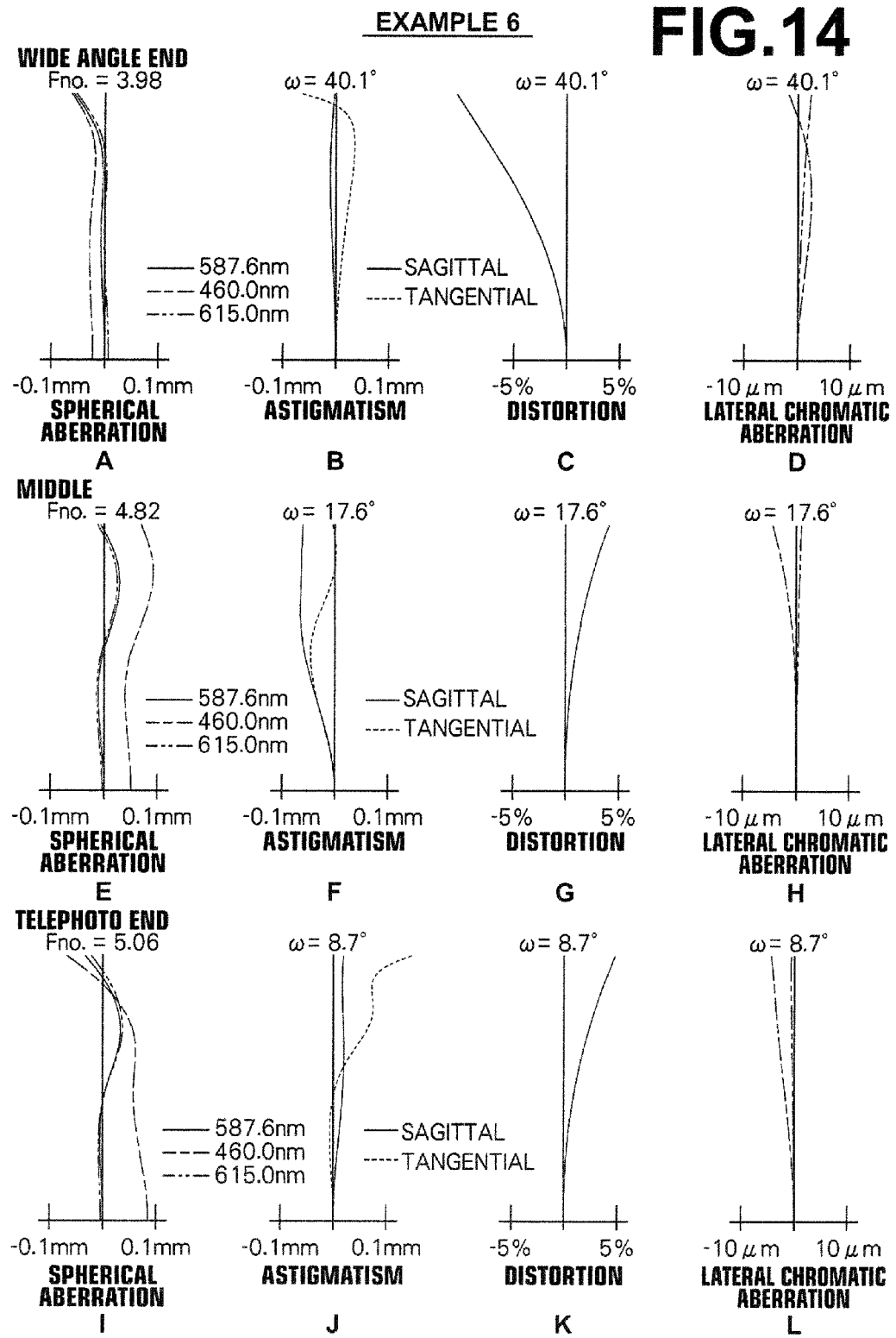
FIG. 14, Sections A through L are aberration diagrams of the zoom lens in Example 6 of the present invention.

Similarly, FIG. 10, Sections A through L, FIG. 11, Sections A through L, FIG. 12, Sections A through L, FIG. 13, Sections A through L, and FIG. 14, Sections A through L show aberration diagrams for the zoom lenses of Examples 2 through 6, respectively.

As the above descriptions and data show, the zoom lenses of Examples 1 through 6 can realize a compact structure that can reduce the thickness of a camera, while a zoom ratio of about 5 times and a wide angle of a full angle of view of about 80 degrees are secured. Further, it is possible to reduce the cost, and the zoom lenses have a high optical performance in which each aberration is corrected in an excellent manner.

So far, the present invention has been described by using embodiments and examples. However, the present invention is not limited to the aforementioned embodiments nor examples, and various modifications are possible. For example, the values of the curvature radius, a distance between surfaces, refractive index, Abbe number, and aspheric coefficients of each lens element are not limited to the values in the aforementioned examples of numerical values, but may be other values.

In the embodiment of the imaging apparatus, a digital camera was illustrated in the drawings and described, as an example. However, the imaging apparatus of the present invention is not limited to this example. For example, the present invention may be applied to a different imaging apparatus, such as a video camera and an imaging unit attached to an information mobile terminal.

What is claimed is:

1. A zoom lens consisting of:
   a first lens group having positive refractive power, and which is fixed during changing magnification and during focusing;
   a second lens group having negative refractive power, and which is moved during changing magnification;
   a third lens group having positive refractive power, and which is fixed during changing magnification and during focusing;
   a fourth lens group having positive refractive power, and which is moved during changing magnification and during focusing; and
   a fifth lens group having negative refractive power, and which is moved during changing magnification, which are in this order from an object side, and
   wherein a lens group constituting the first lens group consists of a front group having negative refractive power and a rear group having positive refractive power in this order from the object side, and
   wherein the second lens group consists of four lenses of a negative lens, a positive lens, a negative lens, and a positive lens arranged in this order from the object side, or consists of four lenses of a negative lens, a positive lens, a negative lens, and a negative lens arranged in this order from the object side.

2. A zoom lens, as defined in claim 1, further comprising:
   a reflection member that bends an optical path between the front group and the rear group in the first lens group.

3. A zoom lens, as defined in claim 1, wherein the following formula (1) is satisfied:

$$0.70 < IH/fw < 0.90 \qquad (1),\text{where}$$

IH: maximum image height, and
   fw: the focal length of an entire system at a wide angle end.

4. A zoom lens, as defined in claim 1, wherein the following formula (2) is satisfied:

$$0.70 < |fG2/fw| < 0.95 \qquad (2),\text{where}$$

fG2: the focal length of the second lens group, and
   fw: the focal length of an entire system at a wide angle end.

5. A zoom lens, as defined in claim 1,
   wherein a most-image-side lens in the second lens group has at least one aspherical surface, and
   wherein the following formula (3) is satisfied:

$$-0.3 < fw/f24 < 0.3 \qquad (3),\text{where}$$

fw: the focal length of an entire system at a wide angle end, and f24: the focal length of a most-image-side lens in the second lens group.

6. A zoom lens, as defined in claim 1, wherein the second lens group includes at least one aspherical lens made of plastic material.

7. A zoom lens, as defined in claim 1, wherein the following formula (4) is satisfied:

$$10.0 < TL/(fw \times \tan(\omega w)) < 13.0 \quad (4),\text{ where}$$

TL: a length on an optical axis from an object-side surface of a most-object-side lens in an entire system to an image plane;

fw: the focal length of an entire system at a wide angle end; and

ωw: a half angle of view at a wide angle end.

8. A zoom lens, as defined in claim 1, wherein the front group in the first lens group consists of a spherical lens having negative refractive power.

9. A zoom lens, as defined in claim 8, wherein the rear group in the first lens group consists of two lenses, each having positive refractive power, and wherein at least an object-side lens of the two lenses has a shape in which a part of an outer diameter shape is cut off.

10. A zoom lens, as defined in claim 1, wherein the following formula (1A) is satisfied:

$$0.70 < IH/fw < 0.85 \quad (1\text{A}),\text{ where}$$

IH: maximum image height; and fw: the focal length of an entire system at a wide angle end.

11. A zoom lens, as defined in claim 1, wherein the following formula (2B) is satisfied:

$$0.80 < |fG2/fw| < 0.89 \quad (2\text{B}),\text{ where}$$

fG2: the focal length of the second lens group;

fw: the focal length of an entire system at a wide angle end.

12. A zoom lens, as defined in claim 1, wherein the following formula (3B) is satisfied:

$$-0.1 < fw/f24 < 0.25 \quad (3\text{B}),\text{ where}$$

fw: the focal length of an entire system at a wide angle end; and f24: the focal length of a most-image-side lens in the second lens group.

13. A zoom lens, as defined in claim 1, wherein the following formula (4A) is satisfied:

$$11.0 < TL/(fw \times \tan(\omega w)) < 12.5 \quad (4\text{A}),\text{ where}$$

TL: a length on an optical path from an object-side surface of a most-object-side lens in an entire system to an image plane;

fw: the focal length of the entire system at a wide angle end; and

ωw: a half angle of view at a wide angle end.

14. An imaging apparatus comprising:

a zoom lens, as defined in claim 1; and an imaging device that images an optical image formed by the zoom lens, and that outputs an electrical signal.

* * * * *